(12) United States Patent
Ishimatsu et al.

(10) Patent No.: US 11,972,590 B2
(45) Date of Patent: Apr. 30, 2024

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventors: Rie Ishimatsu, Tochigi (JP); Makoto Kawaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 17/520,920

(22) Filed: Nov. 8, 2021

(65) Prior Publication Data

US 2022/0172388 A1 Jun. 2, 2022

(30) Foreign Application Priority Data

Dec. 1, 2020 (JP) ................................ 2020-199697

(51) Int. Cl.
*G06T 7/586* (2017.01)
*G06T 7/11* (2017.01)

(52) U.S. Cl.
CPC ................ *G06T 7/586* (2017.01); *G06T 7/11* (2017.01)

(58) Field of Classification Search
CPC ............ G06T 15/50; G06T 7/11; G06T 7/586
USPC ......................................................... 348/46
See application file for complete search history.

(56) References Cited

U.S. PATENT DOCUMENTS 10,984,566 B2 4/2021 Ishimatsu
2016/0210754 A1* 7/2016 Ida .......................... G06T 7/586
2017/0372501 A1* 12/2017 Ishimatsu ............ G06V 10/147

FOREIGN PATENT DOCUMENTS

JP 2017228910 A 12/2017

* cited by examiner

*Primary Examiner* — Christopher S Kelley
*Assistant Examiner* — Ana Picon-Feliciano
(74) *Attorney, Agent, or Firm* — ROSSI, KIMMS & McDOWELL LLP

(57) ABSTRACT

An image processing apparatus includes a first processing task configured to acquire surface normal information of an object, a second processing task configured to acquire a plurality of first images acquired by capturing the object while changing a polarization angle of light from the object, a third processing task configured to acquire polarization information of the object, and a fourth processing task configured to generate a second image in which an illumination state of the object is different from that of each first image. The third processing task acquires light intensity information that changes according to the polarization angle, using the first images. The fourth processing task extracts a partial area of the first images using the surface normal information, and generates the second image using the partial area and the light intensity information.

16 Claims, 17 Drawing Sheets

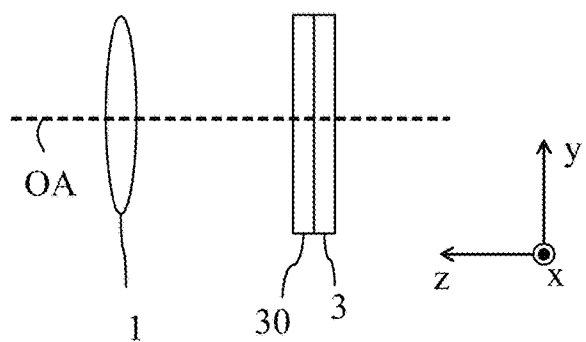
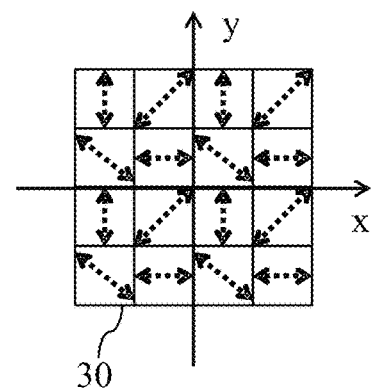
FIG. 3A  FIG. 3B
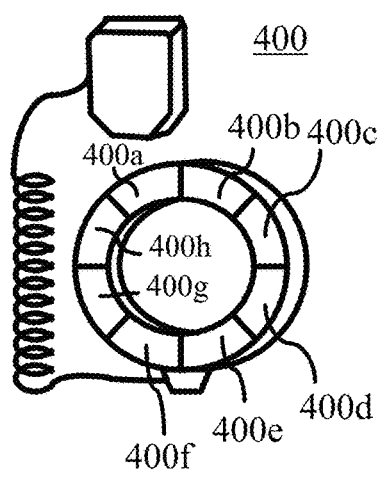
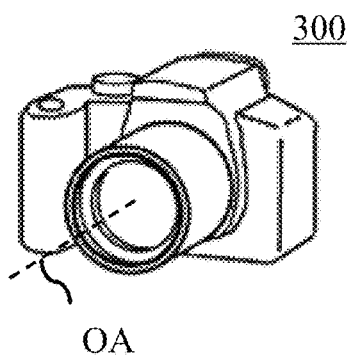
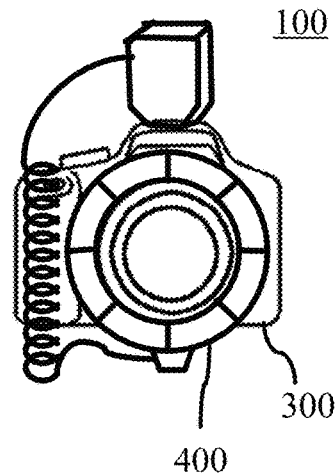
FIG. 4A  FIG. 4B  FIG. 4C

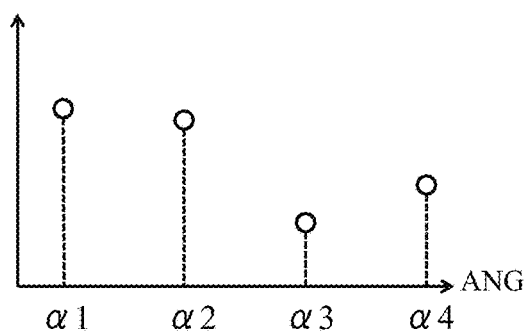 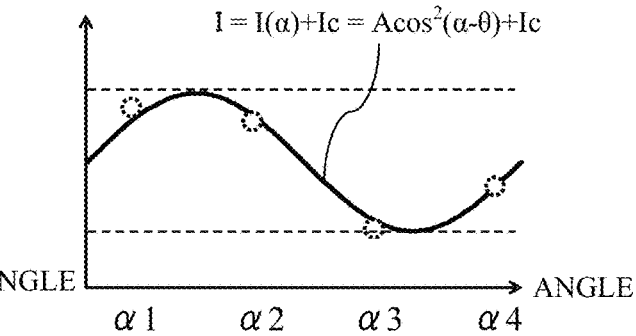
FIG. 6A                FIG. 6B
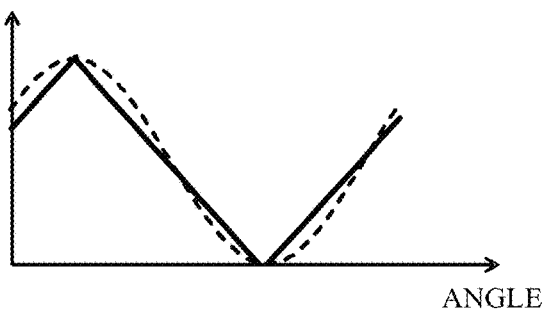 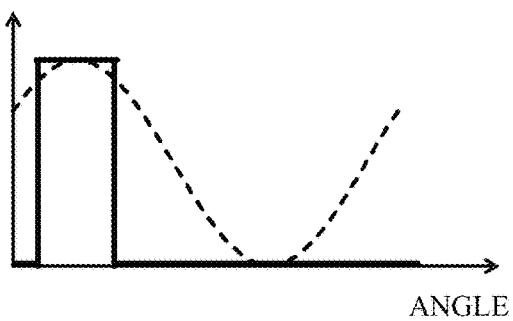
FIG. 7A                FIG. 7B
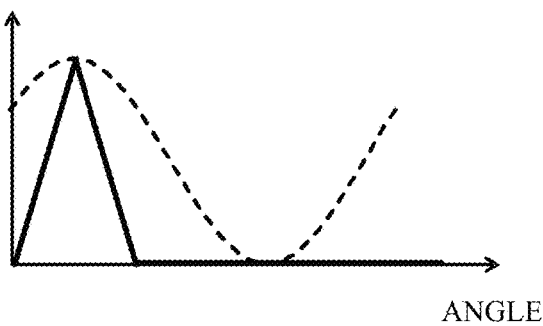
FIG. 7C

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates to an image processing apparatus configured to change an illumination state of an image by using polarization information.

Description of the Related Art

There has conventionally been known an image processing apparatus that changes an illumination state of an image by using polarization information. Japanese Patent Laid-Open No. ("JP") 2017-228910 discloses an image processing apparatus that calculates an angle-dependent component at a specific polarization angle among angle-dependent components that are luminance components that change according to a polarization angle and generates an image by using the angle-dependent component at the specific polarization angle.

The polarization angle has a period of 180° and two polarization angles, such as 0° and 180° or 90° and 270°, are undistinguishable. Therefore, the image processing apparatus disclosed in JP 2017-228910 cannot combine images illuminated from arbitrary directions.

SUMMARY OF THE INVENTION

The present invention provides an image processing apparatus, an image pickup apparatus, an image processing method, and a storage medium, each of which can combine images illuminated from arbitrary directions using polarization information.

An image processing apparatus according to one aspect of the present invention includes at least one processor or circuit configured to execute a plurality of tasks that include a first processing task configured to acquire surface normal information of an object, a second processing task configured to acquire a plurality of captured images acquired by capturing the object while changing a polarization angle of light from the object, a third processing task configured to acquire polarization information of the object, and a fourth processing task configured to generate a generated image in which an illumination state of the object is different from that of each captured image. The third processing task acquires light intensity information that changes according to the polarization angle (information on light intensity that changes according to the polarization angle), using the captured images. The fourth processing task extracts a partial area of an image area in the captured images or the generated image using the surface normal information, and generates the generated image using the partial area and the light intensity information. An image pickup apparatus having the above image processing apparatus also constitutes another aspect of the present invention.

An image processing method according to another aspect of the present invention includes a first step configured to acquire surface normal information of an object, a second step configured to acquire a plurality of captured images acquired by capturing the object while changing a polarization angle of light from the object, a third step configured to acquire polarization information of the object, and a fourth step configured to generate a generated image in which an illumination state of the object is different from that of each captured image. The third step acquires light intensity information that changes according to the polarization angle, using the captured image. The fourth step extracts a partial area of an image area in the captured images or the generated image using the surface normal information, and generates the generated image using the partial area and the light intensity information. A storage medium storing a program that causes a computer to execute this image processing method also constitutes another aspect of the present invention.

An image processing apparatus according to another aspect of the present invention includes at least one processor or circuit configured to execute a plurality of tasks including a first processing task configured to acquire a plurality of captured images obtained by capturing an object while changing a polarization angle of light from the object, a second processing task configured to acquire polarization information of the object, and a third processing task configured to generate a generated image in which an illumination state of the object is different from that of each captured image. The second processing task acquires light intensity information that changes according to the polarization angle from the captured image. The third processing task extracts a partial area of an image area in the captured images or the generated image using a sign of a difference of the polarization information among a plurality of different viewpoints, and generates the generated image using the partial area and the light intensity information. An image pickup apparatus having the above image processing apparatus also constitutes another aspect of the present invention. An image processing method corresponding to the above image processing apparatus and a storage medium storing a program that causes a computer to execute the image processing method also constitute another aspect of the present invention.

Further features of the present invention will become apparent from the following description of exemplary embodiments with reference to the attached drawings.

BRIEF DESCRIPTION OF THE DRAWINGS

FIGS. 3A and 3B are explanatory views of the imaging system and the polarizing element for acquiring the polarization information according to Examples 1 and 2.

FIGS. 4A to 4C are external views of an image pickup apparatus according to Examples 1 and 2.

FIGS. 6A and 6B are explanatory views of a method of calculating an angle-dependent component according to Examples 1 and 2.

FIGS. 7A to 7C are explanatory views of an angle-dependent component $I(\alpha)$ and an approximate function $F(\alpha)$ according to Examples 1 and 2.

DESCRIPTION OF THE EMBODIMENTS

Referring now to the accompanying drawings, a detailed description will be given of embodiments according to the present invention.

A description will now be given of matters common to Examples 1 and 2. Examples 1 and 2 performs the following image processing using input images generated by capturing a plurality of polarized light beams having different polarization directions (polarization azimuths) from an object.

The image processing uses a luminance value of an input image, separates an angle-dependent component that is a luminance component whose polarization direction changes according to a polarization angle $\alpha$ relative to a reference axis and an angle-independent component that is a luminance component whose polarization direction does not change according to the polarization angle $\alpha$, and calculates an angle-dependent component at a specific polarization angle. The image processing separately acquires surface normal information of the object (information on surface normal of the object), extracts a partial area of an image using that information, and generates an output image using the angle-dependent component at the specific polarization angle for the extracted area, in which output image the illumination direction for the object is arbitrarily and intuitively adjusted.

Figure 9A:
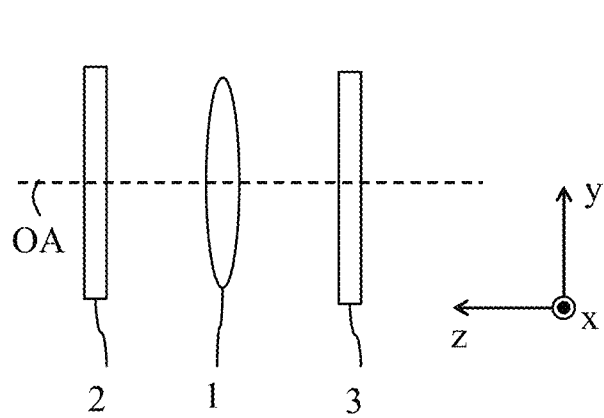
FIGS. 9A and 9B are explanatory views of the imaging system and the polarization angle for acquiring the polarization information according to Examples 1 and 2.
Figure 9B:
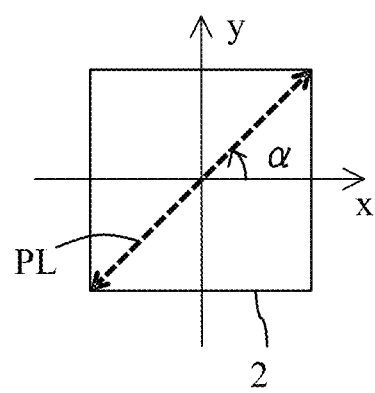

Referring now to FIGS. 9A and 9B, a description will be given of a definition of a polarization angle $\alpha$ according to Examples 1 and 2. FIGS. 9A and 9B are explanatory views of an imaging system and a polarization angle for acquiring the polarization information. FIG. 9A illustrates a relationship between the configuration of the imaging system (such as a digital camera) that performs imaging for acquiring an input image and coordinate axes. The imaging system includes a polarization plate 2, an optical system 1, and an image sensor 3.

Coordinate axes include a z-axis as a direction in which an optical axis OA of the optical system 1 extends, and x- and y-axes as two axes orthogonal to each other in a plane orthogonal to the z-axis, respectively. Then, as illustrated in FIG. 9B, when polarized light PL transmitting through the polarization plate 2 having a transmission axis on the xy plane is imaged by the image sensor 3, an angle between a transmission polarization direction and a reference axis (x-axis) will be referred to as a polarization angle $\alpha$ of the polarized light. The polarization angle $\alpha$ is an angle in a range of $0° \leq \alpha < 180°$.

A description will now be given of a principle of adjusting the illumination direction using an angle-dependent component that is a luminance component that changes according to the polarization angle $\alpha$. When a luminance value of each pixel in captured images obtained by imaging a plurality of polarized light beams having different polarization angles $\alpha$ is plotted against the polarization angle $\alpha$, the luminance value of each pixel is expressed in the following expression (1):

$$I = I_c + I(\alpha) \tag{1}$$

In the expression (1), $I(\alpha)$ is an angle-dependent component that is a luminance component that changes according to the polarization angle $\alpha$, and $I_c$ is an angle-independent component that is a luminance component that does not change according to the polarization angle $\alpha$. In the image processing according to this example, the angle-dependent component $I(\alpha)$ and the angle-independent component $I_c$ are considered to be a specular reflection component and a diffuse reflection component from an object, respectively. This is because the specular reflection component is reflected according to Fresnel's law, thus contains the s-polarized light component more than the p-polarized light component, and depends on the polarization angle, whereas the diffuse reflection component has no polarization dependency.

The specular reflection component in an illumination from a specific direction $\alpha_0$ can be approximated by an angle-dependent component $I(\alpha_1)$ where $\alpha_1 = \alpha_0 + 90$ (deg). An image generated by imaging when the object is illuminated from a direction $\alpha_0$ is (diffuse reflection component)+ (Specular reflection component when the object is illuminated from the direction $\alpha_0$). Therefore, using the above approximation, the luminance value I' of each pixel when the object is illuminated from the direction $\alpha_0$ can be expressed by the expression (2) using the angle-independent component $I_c$ and the angle-dependent component $I(\alpha_0+90°$ at a specific angle. That is, the luminance value I' is expressed as a linear sum of the angle-independent component $I_c$ and the angle-dependent component $I(\alpha)$ at the specific angle:

$$I' = I_c + I(\alpha_0 + 90°) \tag{2}$$

Corresponding images can be combined when the object is illuminated from the direction $\alpha_0$ by calculating the luminance I' of each pixel based on the expression (2).

The expression (2) may be expressed by the following expression (3) using arbitrary coefficients $k_c$ and $k$.

$$I' = k_c \cdot I_c + k \cdot I(\alpha_0 + 90°) \tag{3}$$

At this time, an effect of adjusting a ratio of the specular reflection component and the diffuse reflection component can be obtained by changing $k_c$ and k.

As described above, the polarization angle α is an angle in a range of 0°≤α<180°, and I(α₀) at α₀=0° and I(α₀) at α₀=180° are equivalent. Therefore, in reality, an image generated by I'=$I_c$+I(0°+90°) is an image containing both specular reflection components in the 0° and 180° directions. Accordingly, this example eliminates such indistinguishableness of 180° using the surface normal information, and acquires the image illuminated only in the 0° or 180° direction.

More specifically, this example extracts only a partial area of an image area using the surface normal information, and combines images using an angle-dependent component at a specific angle only for the extracted partial area. For example, in an attempt to generate an image when the object is illuminated from the 0° direction, an area is extracted using the surface normal information that satisfies 0° or more and less than 90° or 270° or more and less than 360° (that is, α−90° or more and less than α+90° relative to the direction α to be illuminated). Since the extracted area does not include an area to which the specular reflection is added when the object is illuminated from the α₀+180° direction, an image when the object is illuminated only from the 0° direction can be generated by applying the expression (2) or (3) only to this area. The surface normal information is information on an orientation of a surface of the object, such as a surface normal vector.

A description will now be given of a photometric stereo method as an example of a method of acquiring the surface normal vector. The photometric stereo method assumes a reflection characteristic of the object based on a surface normal of the object and a direction from the object to the light source, and calculates the surface normal from the reflection characteristic assuming the luminance information of the object at a plurality of light source positions. If the reflectance characteristic is not uniquely determined when a predetermined surface normal and the light source position are given, it may be approximated by a Lambert reflection model that follows the Lambert's cosine law.

Figure 10:
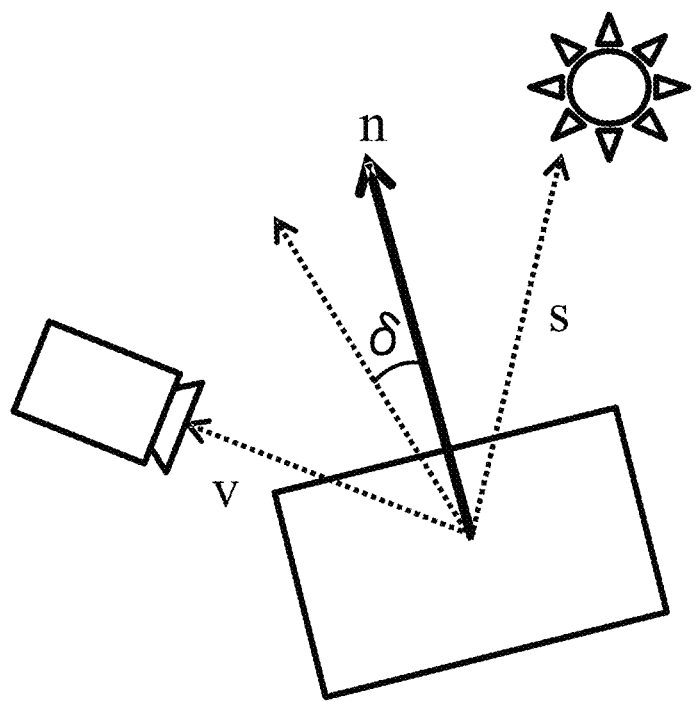
FIG. 10 is an explanatory view of a specular reflection component according to Examples 1 and 2.

FIG. 10 is an explanatory view of a specular reflection component (Torrance-Sparrow model). As illustrated in FIG. 10, the specular reflection component depends on an angle δ formed by a bisection line of a light source vector s and a visual line (line-of-sight) direction vector v, and a surface normal n. Therefore, the reflection characteristic may be a characteristic based on the visual line direction. For accuracy information, the object when the light source is turned on and the object when the light source is turned off are captured and a difference between them is calculated to remove the influence of a light source other than the assumption such as ambient light.

A description will be given of the reflection characteristic assumed in the Lambert reflection model. Assume that i is a luminance value of reflected light, pa is a Lambert diffuse reflectance of the object, E is an intensity of incident light, s is a unit vector (light source direction vector) indicating a direction from the object to the light source (light source direction), and n is a unit surface normal vector of the object. Then, the luminance value i is expressed by the following expression (4) according to the Lambert's cosine law.

$$i = E\rho_d s \cdot n \qquad (4)$$

Where $s_1$, $s_2$, $s_M$ are components of M (M≥3) different light source vectors, and $i_1$, $i_2$, … $i_M$ are luminance values of the components of the light source vectors, the expression (4) can be expressed by the following expression (5).

$$\begin{bmatrix} i_1 \\ \vdots \\ i_M \end{bmatrix} = \begin{bmatrix} s_1^T \\ \vdots \\ s_M^T \end{bmatrix} E\rho_d n \qquad (5)$$

In the expression (5), the left side is the luminance vector of M rows and 1 column, the right side $[s_1^T, \ldots s_M^T]$ is an incident light matrix S indicating light source directions of M rows and 3 columns, and n is a unit surface normal vector of 3 rows and 1 column. For M=3, $E\rho_d n$ is expressed by the following expression (6) using an inverse matrix $S^{-1}$ of the incident light matrix S.

$$E\rho_d n = S^{-1} \begin{bmatrix} i_1 \\ \vdots \\ i_M \end{bmatrix} \qquad (6)$$

The norm of the vector on the left side of the expression (6) is a product of the intensity E of the incident light and the Lambert diffuse reflectance $\rho_d$, and the normalized vector is calculated as the surface normal vector of the object. That is, since the intensity E of the incident light and the Lambert diffuse reflection pa appear only as a form of the product in the conditional expression, if $E\rho_d$ is set to a single variable, the expression (6) can be regarded as a simultaneous equation that determines totally three unknown variables with two degrees of freedom of the unit surface normal vector n. Each variable can be determined by acquiring the accuracy information using at least three light sources. Since no inverse matrix exists when the incident light matrix S is not a regular matrix, it is necessary to select the component $s_1$ to $s_3$ in the incident light matrix S so that the incident light matrix S becomes the regular matrix. That is, the component $s_3$ may be selected linearly independently of s1 and s2.

For M>3, the number of conditional expressions is larger than the number of required unknowns. The unit plane normal vector n may be calculated from three arbitrarily selected conditional expressions by the same method as in a case of M=3. When four or more conditional expressions are used, the incident light matrix S is no longer an invertible matrix. For example, the Moore-Penrose pseudo inverse matrix may be used to calculate the approximate solution. The unit surface normal vector n may be calculated by a fitting method or an optimization method.

Of the luminance values of the components of the light source vector, when the unit surface normal vector n is calculated using the luminance values for which an accurate value cannot be obtained due to shading or a luminance saturation, it is difficult to calculate an accurate normal vector. Therefore, the unit plane normal vector n may be calculated without using the luminance value for which an accurate value could not be obtained due to shading or the luminance saturation. That is, when a luminance value $i_m$ obtained by a light source vector $s_m$ for M=m is derived from shadowing or the luminance saturation, the unit surface normal vector n is calculated by excluding the light source vector $s_m$ and the luminance value $i_m$ from the expression (3). The luminance value to be excluded may be determined by a determination based on a predetermined threshold. As described above, at least three pieces of luminance information are required. Where the reflection characteristic of the object is assumed by a model different from the Lambert reflection model, the conditional expression may differ from the linear equation for the components of the unit surface normal vector n. In this case, once the number of conditional expressions is equal to or greater than the number of unknown variables, a fitting method or an optimization method can be used.

In case of M>3, a plurality of, i.e., 3 or more and M−1 or less conditional expressions can be obtained, and thus a plurality of solution candidates of the unit surface normal vector n can be obtained. In this case, a solution may be selected from among the plurality of solution candidates using still another condition. For example, the continuity of the unit surface normal vector n can be used as a condition. In calculating the unit surface normal n for each pixel of the image pickup apparatus, where $n(x, y)$ is a surface normal at a pixel $(x, y)$ and $n(x-1, y)$ is known, a solution may be selected that minimizes an evaluation function represented by the following expression (7).

$$1 - n(x, y) \cdot n(x - 1, y) \qquad (7)$$

If $n(x+1, y)$ and $n(x, y+1)$ are also known, a solution that minimizes the following expression (8) may be selected.

$$4 - n(x, y) \cdot n(x-1, y) - n(x, y) \cdot n(x+1, y) - \\ n(x, y) \cdot n(x, y-1) - n(x, y) \cdot n(x, y+1) \qquad (8)$$

If there is no known surface normal and there is indistinguishableness of the surface normal at all pixel positions, a solution may be selected that minimizes the sum of all pixels in the expression (8), as in the following expression (9).

$$\sum_{x,y} \{4 - n(x, y) \cdot n(x-1, y) - n(x, y) \cdot n(x+1, y) - \\ n(x, y) \cdot n(x, y-1) - n(x, y) \cdot n(x, y+1)\} \qquad (9)$$

A surface normal of a pixel other than the closest pixel, and an evaluation function weighted according to a distance from a target pixel position may be used. As another condition, luminance information at an arbitrary light source position may be used. In the diffuse reflection model represented by the Lambert reflection model, the closer the unit surface normal vector and the light source direction vector are, the higher the luminance of the reflected light becomes. The unit surface normal vector can be determined by selecting a solution close to the light source direction vector having the highest luminance value among luminance values in a plurality of light source directions.

The following expression (10) is established in the specular reflection model, where s is a light source vector and v is a unit vector in a direction from the object to the camera (visual line vector of the camera).

$$s + v = 2(v \cdot n)n \qquad (10)$$

As expressed by the expression (10), if the light source direction vector s and the camera visual line vector v are known, the unit surface normal vector n can be calculated. If the surface is rough, the specular reflection also has a range of the emission angle, but it spreads near the solution obtained under the assumption of a flat surface and thus a true solution may be determined by averaging directions of a plurality of solutions.

The method of acquiring the surface normal using the photometric stereo method has been thus described. Each example may use other information instead of the surface normal vector. For example, information on a position of a projection of the surface normal of the object onto a plane (the xy plane of the surface normal vector or an imaging plane of the image sensor or a plane orthogonal to the optical axis OA) may be acquired and used as the surface normal information. The information on the position of the projection includes, for example, information on which quadrant from the first quadrant to the fourth quadrant around the optical axis OA the object is included.

Figure 11:
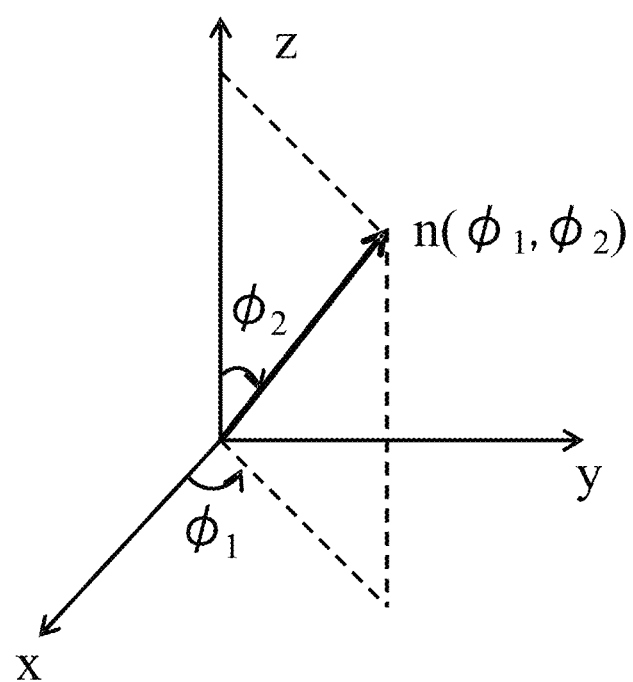
FIG. 11 is an explanatory view of a surface normal vector according to Examples 1 and 2.

Assume as illustrated in FIG. 11 that the surface normal vector is expressed by an azimuth angle $\varphi_1$ ($0° \leq \varphi_1 < 360°$ and a zenith angle $\varphi_2$ ($0° \leq \varphi_2 < 180°$. Then, information used to determine which of $0° \leq \varphi_1 < 180°$ and $180° \leq \varphi_1 < 360°$ is satisfied is acquired. This information can provide information on whether the surface normal is included in the first to second quadrants or the third to fourth quadrants, and thus be used as surface normal information.

Each example can acquire surface normal information based on a plurality of images obtained by capturing an object while sequentially irradiating light from a plurality of light sources located at different positions. Each example can also acquire surface normal information based on areas having different luminances in a plurality of images obtained by capturing an object while sequentially irradiating light from a plurality of light sources located at different positions.

Example 1

A detailed description will now be given of an image processing procedure (image processing method) according to Example 1 of the present invention. The image processing method according to this example includes four steps, such as (1) an image acquiring step, (2) a plane normal information acquiring step, (3) a polarization information acquiring step, and (4) an image combining step.

(1) Image Acquiring Step

The image acquiring step acquires a captured image. The captured image is a digital image obtained by capturing light that has passed through the imaging optical system and the polarizing element utilizing the image sensor. The polarizing element is an element configured to control a direction (angle) of the transmission axis of the transmitting polarized light. The direction of the transmission axis corresponds to a direction of a polarization direction or a polarization angle α.

Figure 12:
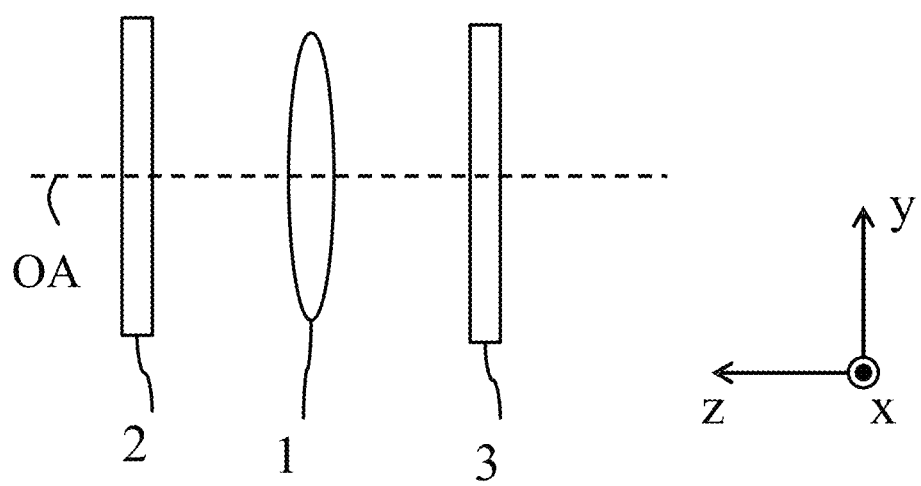
FIG. 12 is an explanatory view of the imaging system and the polarizing element for acquiring the polarization information according to Examples 1 and 2.

The simplest polarizing element can use the polarization plate 2 illustrated in FIG. 12. FIG. 12 is an explanatory view of an imaging system and a polarizing element for acquiring polarization information in this example, and illustrates an element configuration example for acquiring a captured image in this embodiment. In addition to the polarization plate 2, the optical system 1 and the image sensor 3 are provided. Assume that the z-axis is a direction (optical axis direction) along the optical axis OA of the optical system 1, and the x and y axes are directions orthogonal to each other in a plane orthogonal to the z-axis. The direction of the transmitting polarized light (polarization angle α) can be controlled by providing the polarization plate 2 in the xy plane and rotating it in the xy plane around the z-axis.

Figure 1:
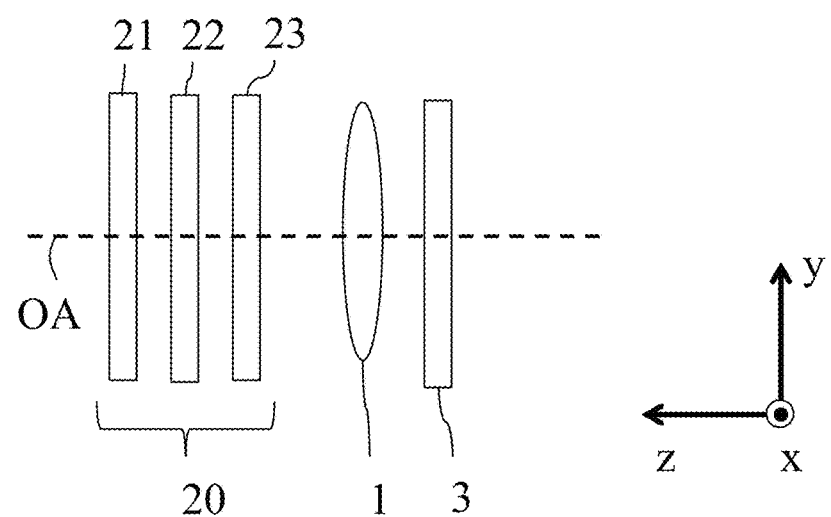
FIG. 1 is an explanatory view of an imaging system and a polarizing element for acquiring polarization information according to Examples 1 and 2.

Another polarizing element can use a polarizing element 20 including a plurality of elements as illustrated in FIG. 1. FIG. 1 is an explanatory view of an imaging system and a polarizing element for acquiring polarization information according to a variation of this example. The polarizing element 20 includes a quarter waveplate 21, a liquid crystal variable phase plate 22, and a polarization plate 23.

Figure 2:
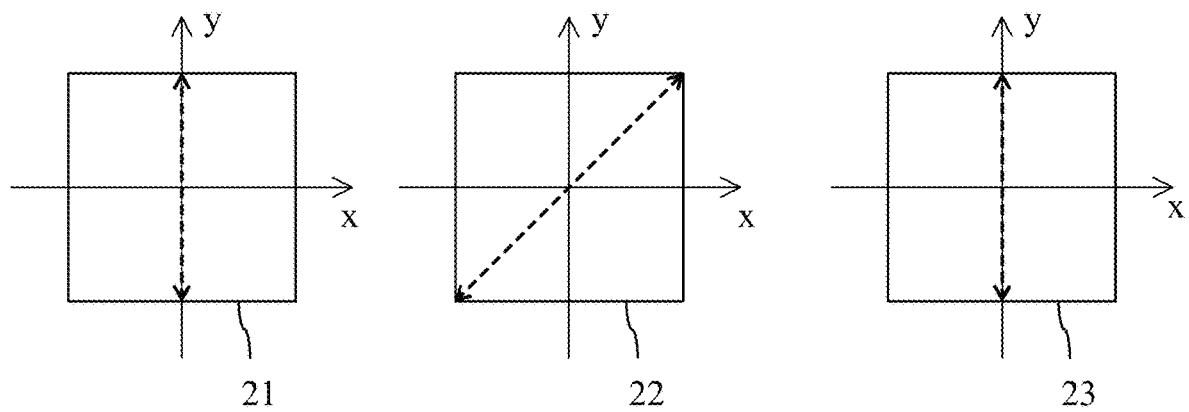
FIG. 2 is an explanatory view of an axial arrangement of the polarizing element according to Examples 1 and 2.

FIG. 2 is an explanatory view of an axial arrangement of the polarizing element 20, illustrating an axial direction of each of the quarter waveplate 21, the liquid crystal variable phase plate 22, and the polarization plate 23 in the polarizing element 20 by dashed arrows. The axial direction indicates a slow axis for the quarter waveplate 21 and the liquid crystal variable phase plate 22, and a transmission axis for the polarization plate 23. The liquid crystal variable phase plate 22 can change a phase difference (retardation) given to incident light by the liquid crystal variable phase plate 22 according to the applied voltage. The polarizing element 20 can change the direction of polarized light that transmits through the entire polarizing element 20 (or the direction of the transmission axis), by controlling the voltage applied to the liquid crystal variable phase plate 22, and acquire the same effect as that obtained by rotating the polarization plate 2 illustrated in FIG. 12. The polarizing element 20 controls the polarization angle α by the applied voltage, realizes higher speed driving than rotating the polarization plate 2, and quickly captures a plurality of input images with different polarization angles α.

Still another polarizing element can use a polarizing element 30 as a polarizer array in which a plurality of polarizers are arranged in the xy plane as illustrated in FIGS. 3A and 3B. FIGS. 3A and 3B are explanatory views of an imaging system and a polarizing element for acquiring polarization information according to still another variation of this example.

As illustrated in FIG. 3B, for example, the plurality of polarizers include a set of four polarizers having different directions of transmission axes (indicated by a broken arrow), and there are a plurality of sets of polarizers. The polarizing element 30 is integrated with or located near the image sensor 3, and enables polarized light beams having different polarization angles α to be imaged for each pixel of the image sensor 3 or for each pixel area including a plurality of pixels. A single input image obtained by this imaging is an image including the luminance information of the polarized light having different polarization angles α for each pixel or each pixel area. In other words, the luminance information of a plurality of polarized light beams can be acquired from a single input image.

This example acquires one or more captured images generated through imaging of a plurality of polarized light beams having different polarization angles α. In acquiring captured images, a plurality of input images having different polarization angles α may be stored in one file or in association with each other using Exif information.

The method of acquiring the captured image is not particularly limited, but when the image processing apparatus that performs the above image processing is built in the image pickup apparatus that includes the image sensor, the image processing apparatus may acquire the image as it is in the image pickup apparatus. When the image processing apparatus is separate from the image processing apparatus, they may be communicably connected to each other by wire or wirelessly, and the image processing apparatus can acquire the image via the communication with the image processing apparatus. The image pickup apparatus may store the image in a recording medium such as a memory card, and the image processing apparatus may acquire the image from the recording medium.

(2) Surface Normal Information Acquiring Step

Figure 5:
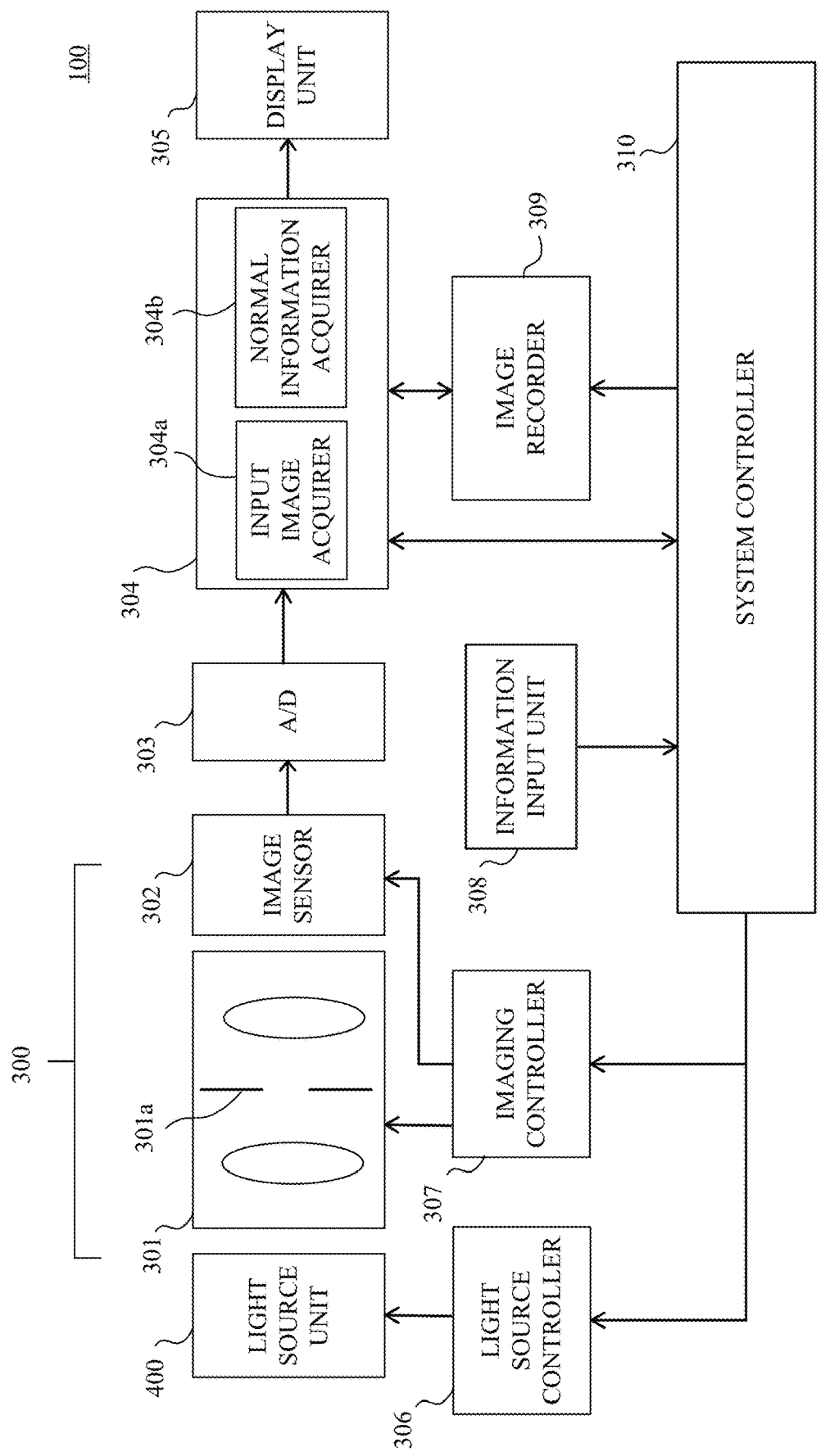
FIG. 5 is a block diagram of the image pickup apparatus according to Examples 1 and 2.

The surface normal acquiring step captures an image used to acquire the surface normal information, and calculates the surface normal information from the acquired image. This example acquires the surface normal using the photometric stereo method. Referring now to FIGS. 4A to 4C and 5, a description will be given of the image pickup apparatus according to this example. FIG. 4C is an external view of the image pickup apparatus 100 according to this example, and FIG. 5 is a block diagram of the image pickup apparatus 100.

As illustrated in FIG. 4C, the image pickup apparatus 100 includes an imaging unit 300 (FIG. 4B) configured to capture an object and a light source unit 400 (FIG. 4A). In this example, the light source unit has, but is not limited to, eight light sources 400*a* to 400*h*. Since at least three light sources are required for the photometric stereo method, at least three light sources may be provided in acquiring the input image. This example provides, but is not limited to, eight light sources concentrically at equal distances from the optical axis OA of the imaging optical system in the imaging unit 300. In this example, the light source unit 400 is detachably attached to the imaging unit 300, but the present invention is not limited to this example. The light source unit 400 may be integrated with the imaging unit 300.

The imaging unit 300 includes an imaging optical system 301 and an image sensor 302. The imaging optical system 301 includes a diaphragm (aperture stop) 301*a* and captures light from an object on the image sensor 302. The image sensor 302 includes a photoelectric conversion element such as a CCD sensor or a CMOS sensor, and images the object. That is, the image sensor 302 photoelectrically converts the image (optical image) of the object formed by the imaging optical system 301 to generate an analog electric signal (image data corresponding to the input image). An A/D converter 303 converts the analog signal generated by the photoelectric conversion of the image sensor 302 into a digital signal, and outputs the digital signal to an image processor 304.

The image processor (image processing apparatus) 304 performs various image processing for the digital signal input from the A/D converter 303. The image processor 304 calculates the normal information of the object. The image processor 304 includes an input image acquirer 304*a* and a normal information acquirer 304*b*. The normal information output by the image processor 304 is stored in a recorder 309, such as a semiconductor memory and an optical disc. The output information may be displayed on a display unit 305. In this example, the input image acquirer 304*a* and the normal information acquirer 304*b* are built in the image pickup apparatus 100, but may be separate from the image pickup apparatus 100.

An information input unit 308 supplies an imaging condition (such as an aperture value (F-number), exposure time, and a focal length) selected by a user to a system controller 310. An imaging controller 307 acquires an image under a desired imaging condition selected by the user based on the information from the system controller 310. A light source controller 306 controls a light emitting state of the light source unit 400 in response to a control instruction from the system controller 310. This example integrates the imaging optical system 301 with the image pickup apparatus, but the present invention is not limited to this example. The present invention is also applicable to a camera system such as a single-lens reflex camera, which includes an image pickup apparatus body having an image sensor and an imaging optical system (interchangeable lens) attachable to and detachable from the image pickup apparatus body.

A description will now be given of surface normal acquiring processing in this example. The surface normal acquiring processing according to this example is executed by the system controller 310 and the image processor 304 according to a processing program as a computer program. The processing program is stored, for example, in a computer-readable storage medium (such as an internal memory of the system controller 310).

First, the input image acquirer 304a acquires a plurality of input images obtained by the imaging unit 300 by capturing images of the object at a plurality of different light source positions. The plurality of input images can be acquired by sequentially irradiating light from a single light source while changing the position of the single light source (using a driver or the like). Alternatively, the plurality of input images may be acquired by sequentially irradiating light from a plurality of light sources located at different positions (such as eight light sources 400a to 400h illustrated in FIG. 4A).

Next, the normal information acquirer 304b acquires the normal information. More specifically, in this example, the normal information acquirer 304b acquires the normal information of the object using a plurality of input images acquired by imaging the object at a plurality of different light source positions. The normal information is calculated based on the change in the luminance information depending on the light source position using the photometric stereo method.

(3) Polarization Information Acquiring Step

The polarization information acquiring step extracts the luminance value I of each pixel from the input image obtained in the image acquiring step, calculates the angle-dependent component I($\alpha$) from the luminance value I and, if necessary, the angle-independent component $I_c$. The angle-independent component $I_c$ may be calculated together with the angle-dependent component I($\alpha$), but the calculation is not always necessary. When the angle-independent component $I_c$ is not directly calculated, it can be indirectly calculated using the luminance value I and the expression (1).

A description will now be given of a calculation method of the angle-dependent component I($\alpha$). Since the angle-dependent component I($\alpha$) is a luminance component that changes according to the polarization angle $\alpha$, it can be expressed by a sine or cosine function having a period of 180°. For example, where A is a maximum value of the angle-dependent component I($\alpha$) and $\theta$ is a polarization angle when the angle-dependent component I($\alpha$) has the maximum value A, the angle-dependent component I($\alpha$) is expressed by the following expression (11).

$$I(\alpha) = A\cos^2(\alpha - \theta) \quad (11)$$

The luminance value I of each pixel can be expressed by the following expression (12) using the angle-independent component $I_c$.

$$I = A\cos^2(\alpha - \theta) + I_c \quad (12)$$

By calculating A and $\theta$ from images captured at three or more different polarization angles $\alpha$ using the expression (11) or (12), the light intensity information that changes according to the polarization angle $\alpha$ or the angle-dependent component I($\alpha$) can be obtained.

Referring now to FIGS. 6A and 6B, a description will be given of a method of calculating the angle-dependent component I($\alpha$). FIGS. 6A and 6B are explanatory views of the method of calculating the angle-dependent component I($\alpha$). FIGS. 6A and 6B illustrate an example in which captured images are acquired with four different polarization angles $\alpha 1$, $\alpha 2$, $\alpha 3$, and $\alpha 4$. FIG. 6A illustrates corresponding luminance values I($\alpha_1$) to I($\alpha_4$) of one pixel in the four input images plotted against the polarization angle $\alpha$. FIG. 6B illustrates a result of fitting the luminance values I($\alpha_1$) to I($\alpha_4$) illustrated in FIG. 6A using the expression (12). Dotted circles in FIG. 6B indicate the luminance values I($\alpha_1$) to I($\alpha_4$) obtained from the four captured images, and a solid curve indicates the fitting result. A, $I_c$, and $\theta$ can be uniquely calculated from the expression (12) when there are three captured images. When there are four or more captured images, A and $I_c$ can be calculated using an optimization method such as the least squares method.

(4) Image Combining Step

The image combining step extracts a partial area of an image area using the surface normal information acquired in the surface normal information calculating step, combines images using the angle information I($\alpha$) obtained in the polarization information acquiring step for the extracted partial area, and generates an output image.

As described above, specular reflection components I'($\alpha_0$) when the object is illuminated from the direction $\alpha_0$ and the direction ($\alpha_0+180°$) can be approximated to the angle-dependent component I($\alpha_0+90$) at ($a_0+90$) (deg). However, the directions $\alpha_0$ and ($a_0+180°$) cannot be distinguished from each other only from the polarization information. Accordingly, the surface normal information acquired in the surface normal information acquiring step is used. Using the normal vector n, an area is extracted in which the azimuth angle ($p_i$ of the surface normal satisfies $\alpha_0-90°\le\varphi_1<\alpha_0+90°$, and images are combined using the angle-dependent component) I($\alpha_0+90°$ that can be regarded as a specular reflection component only for the extracted area. More specifically, for the extracted area, the luminance of each pixel is calculated using the following expression (13), and images are combined.

$$I' = k \cdot I(\alpha_0 + 90°) + k_c \cdot I_c \quad (13)$$

k and kc in the expression (13) are arbitrary constants.

For areas other than the extracted area, images are combined, for example, using the following expression (14).

$$I' = k_c \cdot I_c \quad (14)$$

By separating the extracted area and the other areas, the direction $\alpha_0$ and the direction ($a_0+180°$) can be separated, and the images illuminated only from the direction $\alpha_0$ can be combined.

The method of generating an image illuminated from one direction $\alpha_0$ has been thus described, but the present embodiment is not limited to this example, and images illuminated from a plurality of directions may be generated.

In generating images illuminated from the plurality of directions, an area may be extracted for each direction, and an angle-dependent component $I(\alpha_n+90°)$ or $k_n \cdot I(\alpha_0+90°)$ for a specific angle may be added in the extracted area, where $k_n$ is an arbitrary constant. By adding the angle-independent components $I_c$ or $k_c \cdot I_c$ for all areas, images illuminated from a plurality of directions can be obtained.

The above description has used the angle-dependent component $I(\alpha)$ represented by the expression (11) for the approximation of the specular reflection component, but this example is not limited to this illustration. The angle-dependent component $I(\alpha)$ may be approximated by another approximation function $F(\alpha)$ and I' may be calculated using the approximate number $F(\alpha)$. FIGS. 7A to 7C are explanatory views of the angle-dependent component $I(\alpha)$ (broken line) and the approximate function $F(\alpha)$ (solid line). As illustrated in FIGS. 7A to 7C, an angle at which the approximate function $F(\alpha)$ has the maximum value and an angle at which the angle-dependent component $I(\alpha)$ has the maximum value may coincide with each other.

This example uses both the angle-dependent component and the angle-independent component to combine images, but the image may be generated only from the angle-dependent component. This example has separately described the image pickup apparatus used to acquire the surface normal information and the polarization image used to acquire the polarization information, but the present invention is not limited to this example, and a common image pickup apparatus including a light source unit and a polarizing element may be provided.

Example 2

A description will be given of Example 2 according to the present invention. This example is different from Example 1 in using area information in which the luminance changes between different captured images for the surface normal information in "(2) surface normal information acquiring step," and in using a method that extracts a partial area from the surface normal information in "(4) image combining step." Since the other configurations and methods in this embodiment are the same as those in the first embodiment, a description thereof will be omitted.

Similar to Example 1, this example captures an object by sequentially irradiating light from the light sources 400a to 400h to the object in the "(2) surface normal information acquiring step" using the image pickup apparatus 100 illustrated in FIGS. 4C and 5, and acquires a plurality of captured images. Then, two out of the eight captured images acquired are compared, a luminance changing area is extracted, and the area information is retained as the surface normal information corresponding to the light source of the images used for the comparison.

The two captured images to be compared may be derived from the light sources located at positions closest to the optical axis. For example, a pair of the light sources 400a and 400e, a pair of the light sources 400c and 400g, or the like may be selected. In extracting the luminance changing area, only a brighter area may be extracted when the image is acquired with the light source. For example, in comparing the captured image from the light source 400a and the captured image from the light source 400e, an area in which the captured image from the light source 400a is brighter than the captured image from the light source 400e is retained as surface normal information corresponding to the light source 400a. In addition, an area in which the captured image from the light source 400e is brighter than the captured image from the light source 400a is retained as surface normal information corresponding to the light source 400e. Thus, the surface normal information is acquired for each light source. In the above description, light is sequentially irradiated from the eight light sources to obtain eight images, but it is not always necessary to capture images corresponding to all the light sources. It is not always necessary to acquire the surface normal information for all light sources, and necessary information may be acquired according to images generated using the polarization information, the shape of the object, and the like.

In capturing images, it is unnecessary to turn on the light sources 400a to 400h one by one as long as each image is generated under a different light source condition. For example, the object may be captured using four light sources at a time, such as light sources 400a to 400d and the light sources 400b to 400c, for each imaging, and the number of light sources may be changed for each imaging.

Figure 8:
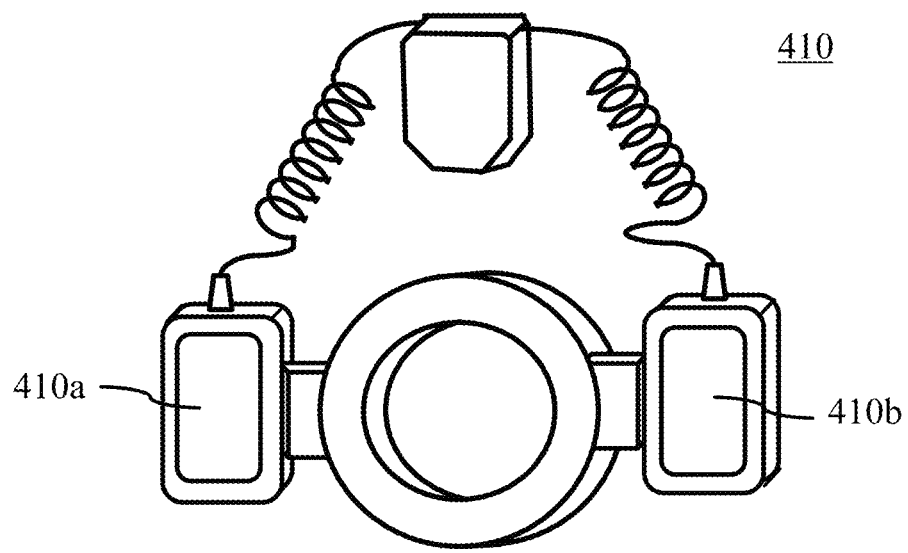
FIG. 8 is an explanatory view of a light source unit according to Examples 1 and 2.

The light source unit 400 is not limited to the configuration illustrated in FIG. 4A. The number of light sources is not limited to eight, and may be two or more. For example, a light source unit 410 illustrated in FIG. 8 which includes light sources 410a and 410b may be used.

This example extracts a partial area based on the surface normal information acquired in "(4) image combining step" as described above. In order to generate an image illuminated from the direction $\alpha_0$, the illumination whose light source position is close to the direction $\alpha_0$ may be selected from among the light sources 400a to 400h for the captured image, and the surface normal information corresponding to the light source may be extracted as the partial area.

This example calculates the surface normal information using the photometric stereo technique, but the present invention is not limited to this example and may calculate the surface normal information using distance information to the object acquired by a distance information measuring unit such as LiDAR.

As described above, the image processing apparatuses according to Examples 1 and 2 can execute first processing, second processing, third processing, and fourth processing. The first processing acquires the surface normal information of the object. The second processing acquires captured images as a first image captured with different polarization angles. The plurality of captured images is obtained by capturing the object while changing the polarization angle of light from the object. The third processing acquires the polarization information of the object. The fourth processing generates a generated image (a combined image) a second image having an illumination state of the object different from that of each captured image. The third processing acquires the light intensity information (angle-dependent component $I(\alpha)$) that changes according to the polarization angle, using the captured images. The fourth processing extracts a partial area of an image area in the captured images or the generated image using the surface normal information, and generates the generated image using the extracted partial area and the light intensity information.

A description will now be given of matters common to Examples 3 to 6. Examples 3 to 6 perform the following image processing for input images acquired by imaging the polarized light beams having a plurality of different polarization angles at a plurality of different viewpoints.

The image processing selects at least two viewpoints from among a plurality of different viewpoints, and calculates polarization information for each pixel using the luminances with a plurality of different polarization angles at each of these viewpoints. The polarization information includes either one or both of the polarization direction (polarization direction) and the degree of polarization ("DOP"). Next, arbitrary two viewpoints among the selected viewpoints are paired, and the image processing calculates a difference in polarization information for each pair or for a plurality of pairs. Then, a specific area of the image is extracted using a (positive or negative) sign of the difference. A difference of zero may be considered either positive or negative.

An angle-dependent component that is a luminance component that changes according to the polarization angle, and an angle-independent component that is a luminance component that does not change according to the polarization angle are separated based on the luminances with a plurality of different polarization angles at a certain viewpoint. Then, an output image is generated by calculating an angle-dependent component with a desired specific polarization angle in the specific area extracted as described above using the separated angle-dependent component. As a result, an output image is obtained in which the illumination direction for the object is arbitrarily and intuitively controlled.

Figure 23A:
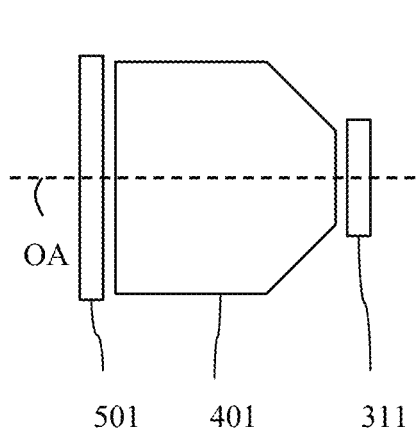
FIGS. 23A and 23B are explanatory views of the imaging system and the polarization angle for acquiring the polarization information according to Examples 3 to 6.
Figure 23B:
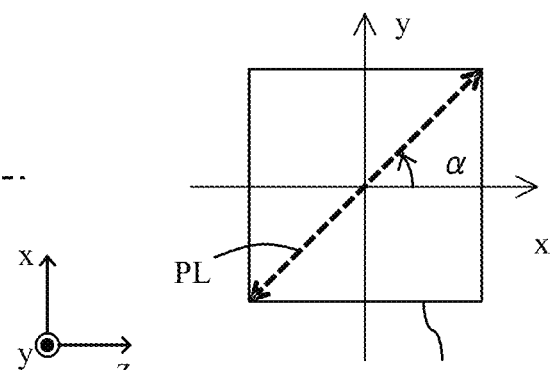

Referring now to FIGS. 23A and 23B, a description will be given of a definition of the polarization angle α in Examples 3 to 6. FIGS. 23A and 23B are explanatory views of an imaging system and a polarization angle for acquiring the polarization information. FIG. 23A illustrates a relationship between the configuration of the imaging system (such as a digital camera) that performs imaging for acquiring an input image and coordinate axes. The imaging system includes a polarization plate (polarizing element) 501, an optical system 401, and a two-dimensional image sensor 310.

The coordinate axes includes a z-axis as an optical axis OA of the optical system 401, and an x-axis and a y-axis as two axes orthogonal to each other in a plane orthogonal to the z-axis, respectively. Then, as illustrated in FIG. 23B, a polarization angle α is defined as an angle formed between a reference axis (x-axis) and a polarization direction PL of the polarized light that transmits through the polarization plate 501 having the transmission axis in the plane parallel to the xy plane. It is understood from FIG. 23B that the polarization angle α has a period of 180°. Although the polarization angle α is defined here with reference to the x-axis, the polarization angle α is not limited to this example, and may be an angle formed against the y-axis. It can be expressed in an arbitrary coordinate system as long as the polarization angle α is uniquely determined.

A description will now be given of an angle-dependent component that is a luminance component that changes according to the polarization angle α, an angle-independent component that does not change according to the polarization angle α, and a polarization direction and the DOP which are polarization information.

Figure 24:
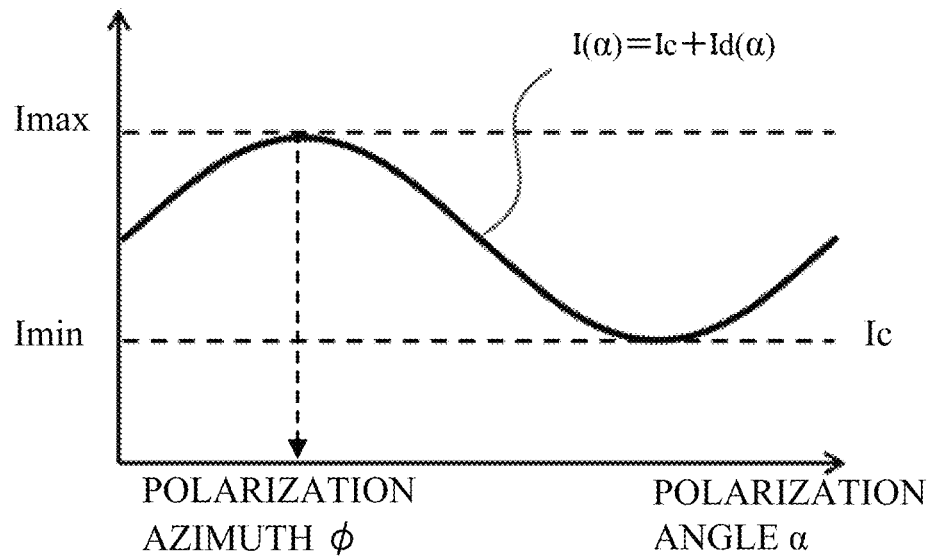
FIG. 24 illustrates a relationship between a luminance and a polarization angle according to Examples 3 to 6.

FIG. 24 illustrates the luminance I for each pixel in a plurality of input images (or one input image as described later) plotted against the polarization angle α, which is obtained by imaging the polarized light beams with different polarization angles α at a certain viewpoint. FIG. 24 illustrates a relationship between the luminance I and the polarization angle α. An ordinate axis represents the luminance I, and an abscissa axis represents the polarization angle α. Therefore, the luminance I in each pixel is expressed by the following expression (15).

$$I(\alpha) = Ic + Id(\alpha) \quad (15)$$

Id(α) is the angle-dependent component that is a luminance component that changes according to the polarization angle α, and Ic is the angle-independent component that is a luminance component that does not change according to the polarization angle α. The angle-dependent component Id(α) and the angle-independent component Ic are considered as a specular reflection component and a diffuse component (scattered component) from an object, respectively. This is because the specular reflection component is generated by the Fresnel reflection, and the s-polarized light component has a higher intensity than that of the p-polarized light component and thus is considered to exhibit the polarization angle dependency. On the other hand, the diffuse component is depolarized in the scattering process and considered to exhibit no polarization angle dependency.

A polarization direction is defined as a polarization angle when the luminance I is maximized. From the above, the polarization direction can be considered to be close to an azimuth of the s-polarized light. Where φ is this polarization direction and Imax is a maximum value of the luminance I, Imax is expressed by the following expression (16).

$$Imax = Ic + Id(\varphi) \quad (16)$$

It can be considered that the luminance I is minimized when the angle-dependent component Id (a) is zero, and where Imin is a minimum value of I, Imin is expressed by the following expression (17).

$$Imin = Ic \quad (17)$$

The DOP indicates the degree to which imaged light is polarized. It may be considered to be the degree of an angle-dependent component in the luminance. ρ representing the DOP is expressed by the following expression (18).

$$\rho = (Imax - Imin)/(Imax + Imin) \quad (18)$$

Principle of Controlling Illumination Direction

A description will now be given of a principle of controlling the illumination direction using the angle-dependent component of the polarized light. First, an image from an object uniformly illuminated can be expressed by the following expression (19).

$$\text{(Diffuse component)} + \text{(Specular reflection component)} \quad (19)$$

For example, when the specular reflection component is intensified, the object is expressed as if it is more brightly illuminated. Next, an image from an object illuminated from a specific direction β (where an angle relative to the x-axis is a direction β) can be expressed by the following expression (20).

$$\text{(Diffuse component)} + \text{(Specular reflection component} \quad (20)$$
$$\text{when illuminated from a specific direction } \beta)$$

Then, a portion where the object surface faces more closely to the specific direction β, that is, a surface whose surface normal azimuth (projection of the surface normal onto the xy plane) is closer to the specific direction β becomes brighter.

It is considered that the specular reflection component when the object is illuminated from the specific direction β can be approximated by the angle-dependent component at the specific polarization angle (β+90°) or Id(β+90°). This is because the s-polarized light component is a polarized light component perpendicular to the incident surface including the surface normal in the Fresnel reflection, so that the polarization angle can be approximated to be orthogonal to the surface normal azimuth. When the polarization angle α is (β+90°), the object surface whose surface normal azimuth is closer to β contains the s-polarized light component more in the luminance component. Since the angle-dependent component Id(α) or the specular reflection component is more, it is expressed as bright.

Based on the above method of expressing the illumination for the object, the luminance I'(β) for each pixel when the object is illuminated from the specific direction β can be approximated by the following expression (21) using an angle-independent component Ic and an angle-dependent component I(β+90°) at the specific polarization angle (β+90°). That is, the approximate value I' of the luminance can be approximated by the linear sum of the angle-independent component and the angle-dependent component at the specific polarization angle.

$$I'(\beta) = Ic + Id(\beta + 90°) \qquad (21)$$

Calculating the approximate value I'(β) of the luminance for each pixel from the expression (21) can combine images of the object that is illuminated from the specific direction β. The expression (21) may be expressed by the following expression (22) using arbitrary coefficients kc and kd of 0 or more.

$$I'(\beta) = kc \cdot Ic + kd \cdot Id(\beta + 90°) \qquad (22)$$

An effect of controlling a ratio of the specular reflection component and the diffuse component can be obtained by changing kc and kd.

As described above, the polarization angle α has a period of 180°. Therefore, the luminance I and the angle-dependent component Id of each pixel have same values at the polarization angles α and (α+180°). Images of an object illuminated from the specific direction β, which is generated with the approximate value I' of the luminance, are not distinguishable between directions forming angles β and (β+180°) relative to the x-axis. The images are generated as if the object was illuminated from both β and (β+180°). Accordingly, this example eliminates the 180° indistinguishableness using the sign of the difference of the polarization information (polarization direction or DOP) acquired at a plurality of different viewpoints, distinguishes the illumination from the β direction and the illumination from the (β+180°) direction, and acquires a controlled image.

More specifically, a specific area in the object image is extracted using the sign of the difference in polarization information between different viewpoints at each point on the object surface. Then, an output image in which the β direction and the (β+180°) direction are selected to illuminate the object is generated by combining images using the angle-dependent component Id(β+90°) of the specific direction θ only in the extracted area.

Principle of Eliminating Indistinguishableness Using Polarization Direction

Referring now to FIGS. 13A to 13G, a description will be given of a principle of extracting an area using a sign of a difference in polarization direction calculated from a plurality of different viewpoints. FIGS. 13A to 13G are explanatory views of the principle of extracting the area.

Figure 13B:
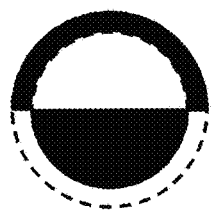
FIGS. 13A to 13G are explanatory views of an area extraction principle according to Examples 3 to 6.
Figure 13E:
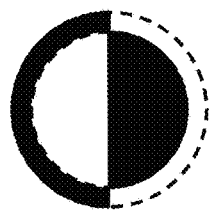
Figure 13C:
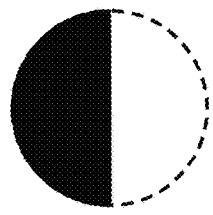
Figure 13F:
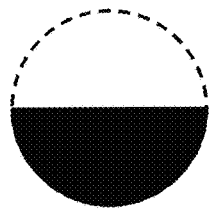
Figure 13D:
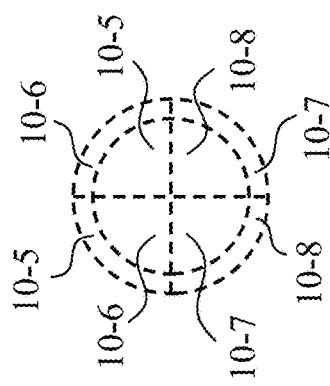
Figure 13G:
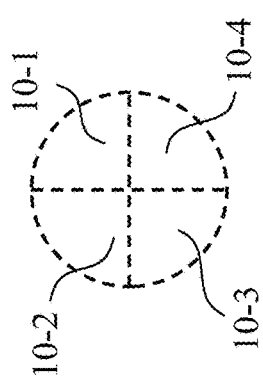
Figure 13A:
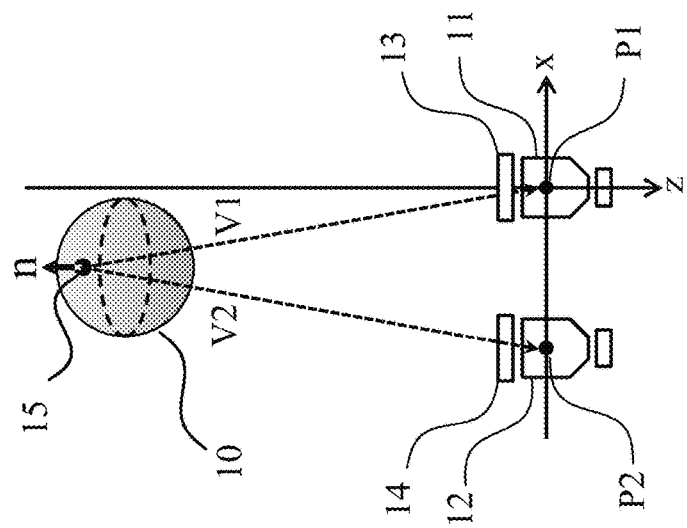

FIG. 13A illustrates an imaging method that sets, to input images, images of an object 10 (exemplifying a sphere) captured at two viewpoints including a viewpoint 1 and a viewpoint 2. Now consider an example in which the optical axes of the optical system at both viewpoints are parallel to each other. The optical axis of an optical system 11 at the viewpoint 1 is set to the z-axis, and a direction from the object to the optical system 11 is set positive. The optical system at both viewpoints is approximated to a single thin lens, and the xy plane perpendicular to the z-axis is set at the position of the pupil of the optical system 11 at the viewpoint P1. That is, an intersection between the z-axis and the xy plane is set to the origin of the coordinate system, and is the coordinate system for the viewpoint P1. In FIG. 13A, the xz plane is parallel to the paper plane.

In FIG. 13A, assume an example in which the pupil in an optical system 12 at the viewpoint P2 is also included in the xy plane. It is assumed that the intersection of the optical axis at the viewpoint P2 and the xy plane (which provides the coordinate system for the viewpoint P2) is located on the x-axis, and a direction on the x-axis from the viewpoint P2 to the viewpoint P1 is set positive. That is, an x-coordinate at the viewpoint P2 is negative. The y-axis is perpendicular to the paper plane, and a direction from the back side to the front side of the paper plane is set positive. The viewpoint P1 has a coordinate (0, 0, 0), and the viewpoint P2 has a coordinate (X, 0, 0). Polarizing elements 13 and 14 are parallel to the xy plane, and the polarization angle α of the transmitting polarized light is defined as an angle relative to the positive direction of the x-axis, as described above.

Assume that a certain point 15 on the object surface has a coordinate (x, y, z). Then, a surface normal n at the point 15 is expressed by the following expression (23).

$$n = \begin{pmatrix} n_x \\ n_y \\ n_z \end{pmatrix} \qquad (23)$$

n is a unit vector. Now assume a light ray reflected at the point 15 toward the viewpoint 1, and it is expressed by a vector V1 in the following expression (24).

$$V1 = \frac{1}{d_1}\begin{pmatrix} -x \\ -y \\ -z \end{pmatrix}, \quad d_1 = \sqrt{x^2 + y^2 + z^2} \qquad (24)$$

The s-polarized light component is vertical to a surface formed by the surface normal n and the reflected light ray V1. A polarization direction of the s-polarized light component can be expressed by a three-dimensional vector s1 in the following expression (25).

$$s1 = n \times V1 = \frac{1}{d_1}\begin{pmatrix} n_z y - n_y z \\ n_x z - n_z x \\ n_y x - n_x y \end{pmatrix} \quad (25)$$

A light ray reflected at the point 15 toward the viewpoint 2 is expressed by a vector V2 in the following expression (26).

$$V2 = \frac{1}{d_2}\begin{pmatrix} X - x \\ -y \\ -z \end{pmatrix}, \quad d_2 = \sqrt{(X-x)^2 + y^2 + z^2} \quad (26)$$

The s-polarized light component is vertical to a plane formed by the surface normal n and the reflected light ray V2. A polarization direction of the s-polarized light component can be expressed by a three-dimensional vector s2 in the following expression (27).

$$s2 = n \times V2 = \frac{1}{d_2}\begin{pmatrix} n_z y - n_y z \\ n_x z - n_z(x-X) \\ n_y(x-X) - n_x y \end{pmatrix} \quad (27)$$

The polarization direction φ can be approximated to the polarization angle α when the s-polarized light component is contained most in the luminance component. In other words, it is the polarization angle α when the polarization direction of the s-polarized light component in the xy plane and the direction of the transmission axis of the polarizing element coincide with each other. The polarization directions of the s-polarized light components in the xy plane at the viewpoints 1 and 2 can be approximated to the projections of the three-dimensional vectors s1 and s2 onto the xy plane. They can be expressed by two-dimensional vectors s1' and s2' in the following expressions (28) and (29), respectively.

$$s1' = \frac{1}{d_1}\begin{pmatrix} n_z y - n_y z \\ n_x z - n_z x \end{pmatrix} \quad (28)$$

$$s2' = \frac{1}{d_1}\begin{pmatrix} n_z y - n_y z \\ n_x z - n_z(x-X) \end{pmatrix} \quad (29)$$

The following expression (30) is established where $\varphi_1$ and $\varphi_2$ are polarization directions at the points 15 at the viewpoints 1 and 2, respectively.

$$\text{Sgn}(\phi_2 - \phi_1) = \text{sgn}(\tan\phi_2 - \tan\phi_1) = \quad (30)$$
$$\text{sgn}\left(\frac{n_x z - n_z(x-X)}{n_z y - n_y z} - \frac{n_x z - n_z x}{n_z y - n_y z}\right) - 90° \leq \phi_1 < 90°,$$
$$-90° \leq \phi_2 < 90°$$

sgn is a sign function. The expression (30) can be transformed into the following expression (31).

$$\text{sgn}\left(\frac{n_x z - n_z(x-X)}{n_z y - n_y z} - \frac{n_x z - n_z x}{n_z y - n_y z}\right) = \text{sgn}\left(\frac{X/z}{y/z - n_y/n_z}\right) \quad (31)$$

Here, y/z can be approximated to 0 in consideration of the fact that the distance between the optical system and the object is sufficient in the z-axis direction and the angle of view does not become too large in many cases in capturing an actual object. Therefore, the following expression (32) is established about the sign of the difference between $\varphi_1$ and $\varphi_2$.

$$\text{sgn}(\phi_2 - \phi_1) = \text{sgn}\left(-\frac{X/z}{n_y/n_z}\right) \quad (32)$$

Due to the definition in FIG. 13A, X<0, z<0, and nz>0 are established. In case of ny>0 or when the object surface faces upward, the difference $\varphi_2-\varphi_1$ in polarization direction becomes negative. In case of ny<0 or when the object surface faces downward, the difference $\varphi_2-\varphi_1$ in polarization direction is positive. On the contrary, a specific area can be extracted from the object image according to whether the object surface faces upward or downward using the sign of the difference in polarization direction.

FIG. 13B illustrates an example of an area extraction on the sphere 10 in FIG. 13A. In FIG. 13B, black represents an area in which the difference has a negative sign, and white represents an area in which the difference has a positive sign. FIG. 13B uses only two viewpoints different in the x-axis direction (this is called a parallax in the x-axis direction), but may use a parallax in another direction, such as the y-axis direction. Thereby, the area extraction depends not only on the vertical orientation of the object surface but also on the horizontal orientation. First, assume a viewpoint 3 located in the negative direction on the y-axis from the viewpoint 1 or having a coordinate (0, Y, 0) (Y<0). At this time, when nx>0 or when the object surface faces rightward, the difference in polarization direction $\varphi_2-\varphi_1$ becomes positive. When nx<0 or when the object surface faces leftward, the difference $\varphi_2-\varphi_1$ in polarization direction becomes negative.

FIG. 13C illustrates an example of an area extraction from the sphere 10 in FIG. 13A using the sign of the difference in polarization direction and the parallax in the y-axis direction. In FIG. 13C, black represents an area in which the difference has a negative sign, and white represents an area in which the difference has a positive sign.

FIG. 13D illustrates an example of area extractions from the sphere 10 in FIG. 13A using the parallax in the y-axis direction and using the parallax in the x-axis direction described above. In FIG. 13D, an area 10-1 has negative and positive signs in FIGS. 13B and 13C, respectively, an area 10-2 has negative and negative signs in FIGS. 13B and 13C, respectively, an area 10-3 has positive and negative signs in FIGS. 13B and 13C, respectively, and an area 10-4 has positive and positive signs in FIGS. 13B and 13C, respectively. In this way, use of parallaxes in a plurality of different directions can increase the number of area divisions in the object image, and enables a smaller area to be extracted. It is noted that when there are three or more different viewpoints on one straight line, a result is the same regardless of use of any two viewpoints for the area extraction. In using parallaxes in multiple directions, a set of directions that make an angle formed by the parallax directions as large as possible, such as a right angle in case of two directions.

The indistinguishableness of 180° can be eliminated according to the orientation of the object surface by combining this area extraction with an illumination control using the angle-dependent component Id(β+90°) in the specific direction β. As a result, an image can be generated in which the object is more naturally illuminated.

Principle of Eliminating Indistinguishableness Using DOP

Referring back to FIG. 13A, a description will be given of a principle of extracting an area based on a sign of a difference in DOP (degree of linear polarization: DOLP) calculated at a plurality of different viewpoints.

Now assume an example of calculating the DOP by inputting an image of an object captured at two viewpoints including the viewpoints 1 and 2. An inner product of the surface normal n at the point 15(x, y, z) on the object surface and the light ray V1 reflected at the point 15 toward the viewpoint 1 is expressed by the following expression (33).

$$n \cdot V1 = -\frac{1}{d_1}(n_x x + n_y y + n_z z) \quad (33)$$

An inner product of the surface normal n at the point 15 and the light ray V2 reflected at the point 15 toward the viewpoint 2 is expressed by the following expression (34).

$$n \cdot V2 = -\frac{1}{d_2}\{n_x(x - X) + n_y y + n_z z\} \quad (34)$$

Assume θ1 and θ2 are angles formed by the reflected light rays V1 and V2 and the surface normal n, respectively. In order to image the reflected light rays V1 and V2, it is considered that 0≤θ1≤90° and 0≤θ2≤90° are satisfied. Therefore, 0≤n·V1≤1 and 0≤n·V2≤1 are established.

The DOP ρi (i is a subscript of 1 or 2) at the point 15 at the viewpoints 1 and 2 can be expressed by the following expression (35).

$$\rho_i = k \frac{2\sin\theta_i \tan\theta_i \sqrt{m^2 - \sin^2\theta_i}}{m^2 - 2\sin^2\theta_i + \tan^2\theta_i} \quad (i = 1, 2) \quad (35)$$

Figure 25:
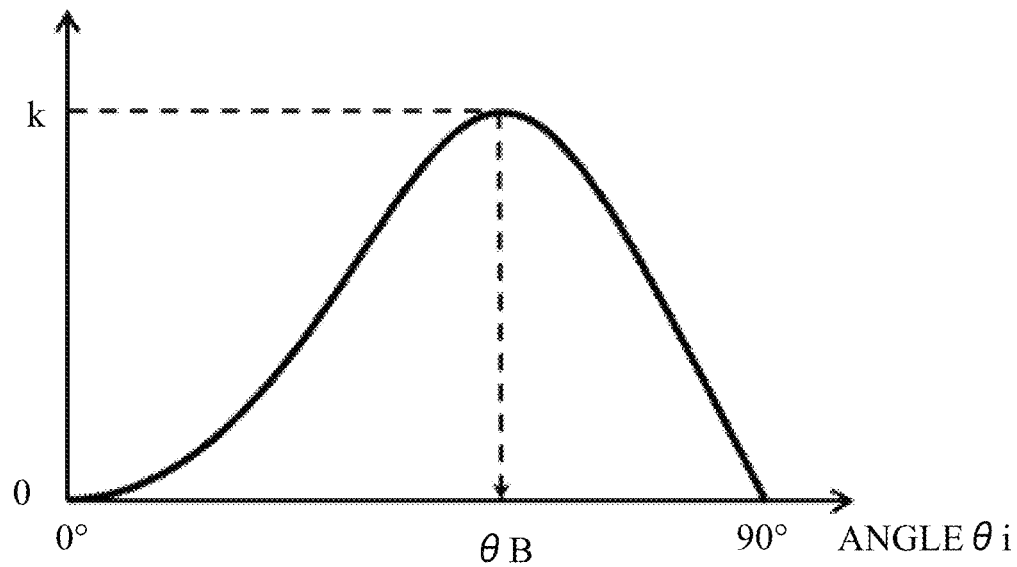
FIG. 25 is an explanatory view of a degree of polarization (DOP) according to Examples 3 to 6.

Here, m is a refractive index of a material on the object surface, and k corresponds to a ratio of the specular reflection component to the luminance component at the point 15 and satisfies 0≤k≤1. m and k depend on the surface characteristic of the object at the point 15, and can be regarded as constants regardless of an imaging viewpoint. FIG. 25 plots the expression (21).

FIG. 25 is an explanatory view of the DOP. In FIG. 25, an abscissa axis represents an angle θi, and an ordinate axis represents the DOP ρ. An angle θB in FIG. 25 corresponds to a Brewster angle of the Fresnel reflection (or the specular reflection). Thereby, it is understood that the DOP ρi monotonically increases against θi in case of 0°≤θi≤θB, while monotonically decreases in case of θB≤θi≤90°. Thus, the following expression (36) is established for the sign of the difference between ρ1 and ρ2 using the sign function.

$$\mathrm{sgn}(\rho_2 - \rho_1) = g \; \mathrm{sgn}(\theta_2 - \theta_1) = -g \; \mathrm{sgn}(n \cdot V2 - n \cdot V1) = \quad (36)$$
$$g \; \mathrm{sgn}\left(\frac{1}{d_2}\{n_x(x - X) + n_y y + n_z z\} - \frac{1}{d_1}(n_x x + n_y y + n_z z)\right)$$
$$g = 1 \text{ if } 0° \leq \theta_i \leq \theta_B \text{ and } g = -1 \; (i = 1, 2) \text{ if } \theta_B \leq \theta_i \leq 90°$$

Distances d1 and d2 from the point 15 to the viewpoints 1 and 2 on the rightmost side of the expression (36) are considered to satisfy an approximation of d1=d2, because the optical system and the object are sufficiently separated from each other in the z-axis direction in many cases in actual imaging and thus d1 and d2 are substantially equal to each other. The following expression (37) can be obtained by further modifying the rightmost side of the expression (36).

$$g \; \mathrm{sgn}\left(\frac{1}{d_1}\{n_x(x - X) + n_y y + n_z z\} - \frac{1}{d_1}(n_x x + n_y y + n_z z)\right) = \quad (37)$$
$$g \; \mathrm{sgn}\left(-\frac{n_x X}{d_1}\right)$$

In summary, the following expression (38) is established for the sign of the difference between ρ1 and ρ2.

$$\mathrm{sgn}(\rho_2 - \rho_1) = g \; \mathrm{sgn}(\theta_2 - \theta_1) = g \; \mathrm{sng}\left(-\frac{n_x X}{d_1}\right) \quad (38)$$
$$g = 10° \text{ if } \leq \theta_i \leq \theta_B \text{ and } g = -1 \; (i = 1, 2) \text{ if } \theta_B \leq \theta_i \leq 90°$$

Roughly speaking, when the optical system and the object are sufficiently separated in the z-axis direction and the angle of view does not become too large, the reflected light rays V1 and V2 can be considered parallel to the z-axis. Therefore, the angle θi (i=1, 2) in the expression (24) formed by the surface normal n and V1 or V2 can be quantitively paraphrased as the angle θz (0° or more and 90° or less) formed by the surface normal n and the z-axis.

In view of the fact of X<0 and d1>0 from the definition in FIG. 13A, in case of nx>0 or on an object surface facing to the right, the difference in DOP ρ2−ρ1 is positive when θz is smaller than θB and negative when θz is larger than θB. In case of nx<0 or on an object surface facing to the left, the difference in DOP ρ2−ρ1 is negative when θz is smaller than θB and positive when θz is larger than θB.

On the contrary, a specific area can be extracted from the object image according to the lateral orientation of the object surface using the sign of the difference in DOP. That is, an area is divided in a direction orthogonal to the vertical direction when the sign of the difference in polarization direction is used. FIG. 13E illustrates an example of an area extraction from the sphere 10 in FIG. 13A. In FIG. 13E, black represents an area where the sign of the difference is negative, and white represents an area where the sign of the difference is positive. As understood from FIG. 13E, due to the presence of θB, the orientations of the left and right surfaces cannot be completely distinguished. Considering this problem as well as an object shape, the sign of the difference in DOP may be used for the area extraction.

The above description uses only a parallax in the x-axis direction, but may use a parallax in another direction, such as the y-axis direction. Thereby, an area can be extracted not only according to the horizontal orientation but also the vertical orientation of the object surface. When the DOP calculated at the viewpoint 1 and that at the viewpoint 3 located in the negative direction on the y-axis are used, in case of ny>0 or when an object surface faces upward, the difference in DOP ρ2−ρ1 is positive when Oz is smaller than OB and negative when Oz is larger than OB. In case of ny<0 or when the object surface faces downward, the difference in DOP ρ2−ρ1 is negative when Oz is smaller than OB and positive when Oz is larger than OB.

FIG. 13F illustrates an example of an area extraction from the sphere 10 in FIG. 13A. In FIG. 13F, black represents an area where the sign of the difference is negative, and white represents an area where the sign of the difference is positive. A smaller area may be extracted by using parallaxes in a plurality of different directions, such as an area extraction using a parallax in the y-axis direction and an area extraction using a parallax in the x-axis direction described above.

In the above description, the area extraction uses the sign of the difference in polarization direction or the sign of the difference in DOP obtained by the parallax in one or more directions. Since both the polarization direction and the DOP are calculated from the input image, the area extraction may use the signs of the differences of both of them.

FIG. 13G illustrates an example of area extractions from the sphere 10 in FIG. 13A using the parallax in the x-axis direction. In FIG. 13G, an area 10-5 has negative and positive signs in FIGS. 13B and 13E, respectively, an area 10-6 has negative and negative signs in FIGS. 13B and 13E, respectively, an area 10-7 has positive and negative signs in FIGS. 13B and 13E, respectively, and an area 10-8 has positive and positive signs in FIGS. 13B and 13E, respectively. In this way, for the parallax in the same direction, divided areas are orthogonal each other between the polarization direction and the DOP according to the sign of the difference between the viewpoints. Therefore, a smaller area can be extracted in the object image by using both of them.

The 180° indistinguishableness is eliminated according to the orientation of the object surface by combining the area extraction described above with the illumination control using the angle-dependent component Id(β+90°) in the specific direction β. As a result, this configuration can generate an image in which an object is illuminated more naturally.

Next follows a description of an image processing procedure (image processing method). The image processing method includes four steps ST1 to ST4, i.e., (1) image acquiring step ST1, (2) polarization information acquiring step ST2, (3) area extracting step ST3, and (4) image combining step ST4. These steps ST1 to ST4 also correspond to FIG. 22 according to Example 4 described later.

(1) Image Acquiring Step ST1

The image acquiring step ST1 acquires an input image. The input image is a digital image obtained by imaging polarized light that has transmitted through the optical system and the polarizing element at a two-dimensional image sensor for each of a plurality of different viewpoints.

A plurality of different viewpoints are obtained by capturing an object from a plurality of different points (spatial coordinates) (example illustrated in FIG. 13A). A plurality of image pickup apparatuses located at different locations may be used, or one image pickup apparatus may be moved to a plurality of locations. This method requires processing of associating pixels indicating the same position of an object among a plurality of input images. Representative processing is, for example, template matching, which estimates a positional shift amount between input images and provides an alignment so that the positional shift amount becomes 0.

Multiple different viewpoints are obtained by dividing a pupil of the optical system. One conceivable pupil dividing method is, for example, to shield part of the diaphragm in the optical system asymmetrically with respect to the optical axis and to perform imaging while sequentially changing the shielded portion. Another conceivable example is a method of effectively dividing the pupil that provides an element, such as a film, for shielding part of incident light upon a pixel near a microlens or a color filter in the pixel in a two-dimensional image sensor. Still another example is a method of effectively dividing the pupil that provides two or more photodiodes to each pixel in the two-dimensional image sensor.

Figure 14A:
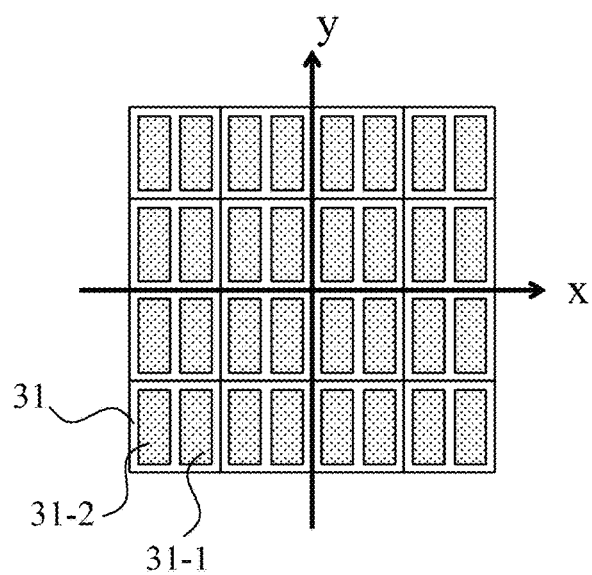
FIGS. 14A and 14B are explanatory views of a two-dimensional image sensor according to Examples 3 to 6.
Figure 14B:
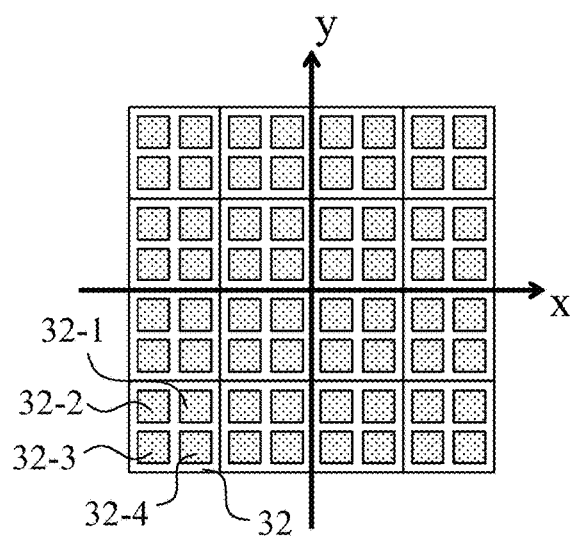

FIGS. 14A and 14B are explanatory views of the two-dimensional image sensor, illustrating an example of the two-dimensional image sensor used to divide the pupil in the optical system. FIG. 14A illustrates a two-dimensional image sensor 311a having two photodiodes 31-1 and 31-2 arranged in the x-axis direction. Thereby, the pupil can be divided into two in the x-axis direction. FIG. 14B illustrates a two-dimensional image sensor 311b having four photodiodes 32-1 to 32-4 arranged two each in both the x-axis direction and the y-axis direction. By using the input images generated from the luminance of each of the photodiodes 32-1 to 32-4, the pupil can be divided into two in a direction of 45° with respect to the x-axis and two in a direction of 135° with respect to the x-axis, totally four. When the input images are generated from two luminances of the photodiodes 32-1 and 32-2, two luminances of the photodiodes 32-2 and 32-3, two luminances of the photodiodes 32-3 and 32-4, and two luminances of the photodiodes 32-4 and 32-1, the pupil can be divided into two in the x-axis direction and two in the y-axis direction, totally four.

In obtaining multiple different viewpoints by dividing the pupil, a single image pickup apparatus may be used and provide imaging at a single location. This configuration can omit processing of associating pixels indicating the same position of an object among the input images obtained at different viewpoints. Therefore, the operation and image processing are simpler than those of imaging at a plurality of positions.

The polarizing element limits the polarization direction (angle) of the transmission light to the direction (angle) of the transmission axis of the polarizing element. The direction of the transmission axis corresponds to the polarization direction of the transmission light or the polarization angle α. Making the direction of the transmission axis variable can adjust the polarization angle α to a desired one.

The simplest polarizing element is to use a polarization plate 501 illustrated in FIGS. 23A and 23B. The polarization plate 501 provided in a plane parallel to the xy plane and made rotatable in the xy plane around the optical axis OA enables the polarization angle α of the transmitting polarized light to be controlled.

Figure 15A:
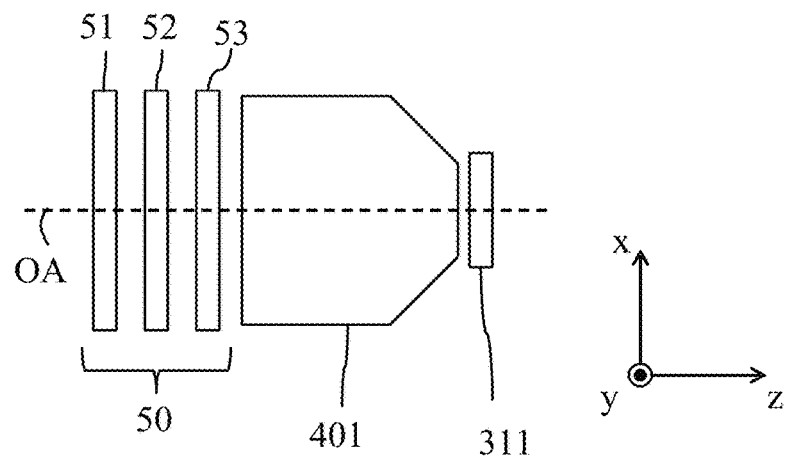
FIGS. 15A to 15D are explanatory views of polarizing elements according to Examples 3 to 6.

FIGS. 15A to 15D are explanatory views of another polarizing element. This example of the other polarizing element uses, as illustrated in FIG. 15A, a polarizing element 50 including a plurality of elements. The polarizing element 50 includes a quarter waveplate 51, a liquid crystal variable phase plate 52, and a polarization plate 53.

Figures 15B, 15C, 15D:
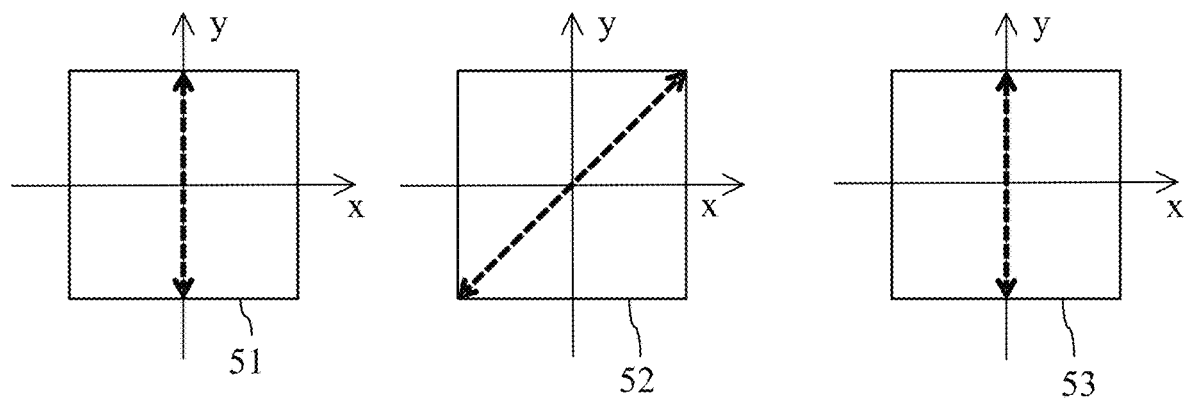

Dashed arrows in FIGS. 15B to 15D illustrate orientations of axes of the quarter waveplate 51, the liquid crystal variable phase plate 52, and the polarization plate 53 in the polarizing element 50. The orientation of the axis is a slow axis for the quarter waveplate 51 and the liquid crystal variable phase plate 52, and a transmission axis for the polarization plate 53. The liquid crystal variable phase plate 52 can change a phase difference (retardation) given to the incident light by the liquid crystal variable phase plate 52 according to the applied voltage. The polarizing element 50 can change the polarization angle α of the polarized light that transmits through the entire polarizing element 50, by controlling the voltage applied to the liquid crystal variable phase plate 52, and realizes the same effect as that when the polarization plate 501 illustrated in FIGS. 23A and 23B is rotated.

Figure 16A:
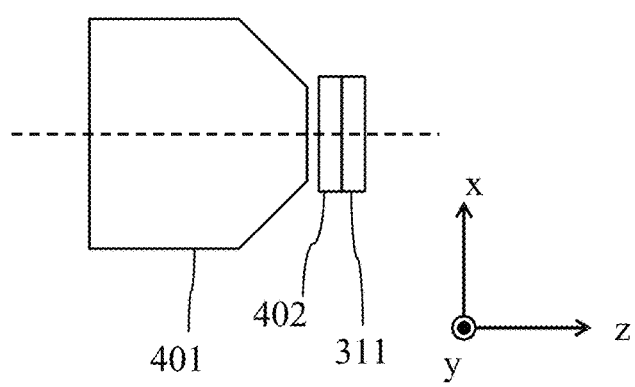
FIGS. 16A and 16B are explanatory views of the polarizing elements according to Examples 3 to 6.
Figure 16B:
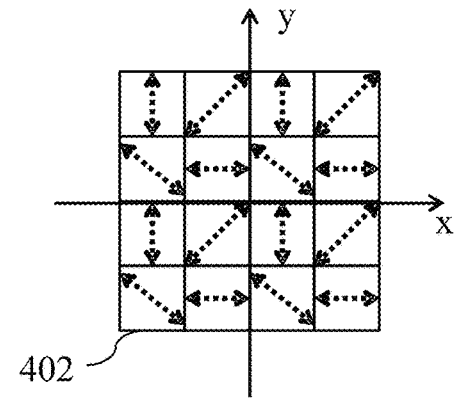

FIGS. 16A and 16B are explanatory views of yet another polarizing element 402. The polarizing element 402 is a polarizing element array in which a plurality of polarizers illustrated in FIG. 16B are arranged in a plane parallel to the xy plane. As illustrated in FIG. 16B, for example, the plurality of polarizers include a plurality of sets of four polarizers each set having different directions of the transmission axes (indicated by a dashed arrow). The polarizing element 40 is integrated with or provided near the two-dimensional image sensor 311 (311*a*, 311*b*). The polarized light beams having different polarization angles α are imaged for each pixel or for each pixel area including a plurality of pixels of the two-dimensional image sensor 311 (311*a*, 311*b*). One input image obtained by this imaging is an image including luminance information of polarized light beams having different polarization angles α for each pixel or each pixel area. That is, the luminance information of a plurality of polarized light beams can be obtained from a single input image.

As described above, the step ST1 acquires, as an input image, one or more images generated by imaging a plurality of polarized light beams having different polarization angles α. In acquiring the input image, a plurality of input images having different polarization angles α may be stored in one file or in association with each other using Exif information.

The method of acquiring the input image is not particularly limited, but when the image processing apparatus that performs the above image processing is built in the image pickup apparatus including the two-dimensional image sensor, the image processing apparatus may directly acquire the input image in the image pickup apparatus. When the image processing apparatus is separate from the image processing apparatus, they may be communicably connected to each other by wire or wirelessly, and the image processing apparatus can acquire the input image from the image processing apparatus via the communication. The image pickup apparatus may store images in a recording medium such as a memory card, and the image processing apparatus may acquire them via the recording medium.

(2) Polarization Analyzing Step ST2

The polarization analysis step ST2 (polarization information acquiring step) extracts luminances I(α) with a plurality of different polarization angles α at each point on the object surface from the input image acquired in the image acquiring step ST1 for each of a plurality of different viewpoints. Then, the angle-dependent component Id(α) of each point on the object surface is calculated from the luminance I(α), and the angle-independent component Ic is calculated, as necessary. The angle-independent component Ic may be calculated with the angle-dependent component Id(α), but the calculation is not always necessary. When the angle-independent component Ic is not directly calculated, it can be calculated indirectly using the luminance I and the expression (15).

A description will be given of the method of calculating the angle-dependent component Id(α). The angle-dependent component Id(α) is a luminance component changes according to the polarization angle α having a periodicity of 180°, and can be expressed by a sine or cosine function having a period of 180°. For example, where A is a maximum value of the angle-dependent component Id(α) and φ is a polarization angle (polarization direction from the above definition), the angle-dependent component Id(α) is as expressed in the following expression (39).

$$Id(\alpha) = A \cdot \cos^2(\alpha - \varphi) \tag{39}$$

The luminance I of each pixel can be expressed by the following expression (40) further using the angle-independent component Ic.

$$I(\alpha) = Ic + A \cdot \cos^2(\alpha - \varphi) \tag{40}$$

Using the expression (39) or (40), A and φ can be calculated from the input images of three or more different polarization angles α, and the angle-dependent component Id(α) can be obtained.

Figure 17A:
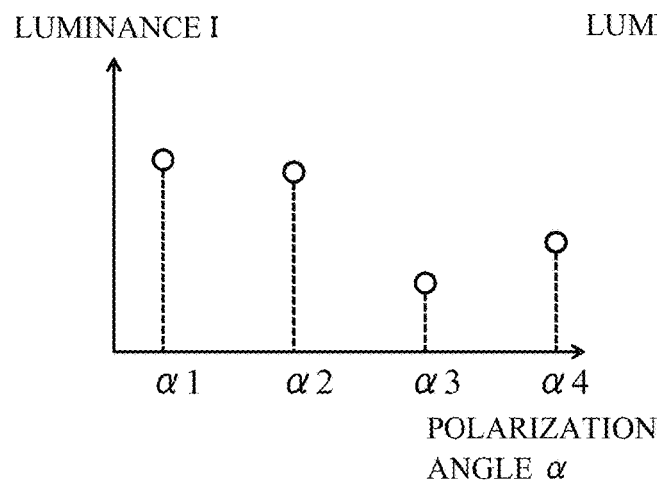
FIGS. 17A and 17B are explanatory views of a method for calculating an angle-dependent component $Id(\alpha)$ according to Examples 3 to 6.
Figure 17B:
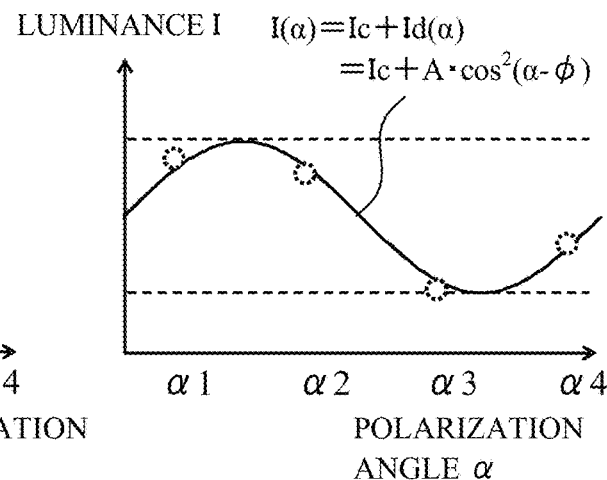

FIGS. 17A and 17B illustrate an example of a method for calculating the angle-dependent component Id(α). These figures illustrate an example in which images of four different polarization angles α1, α2, α3, and α4 are acquired at a certain viewpoint from the input images. FIG. 17A plots the luminances I(α1) to I(α4) of the corresponding pixels in these four images against the polarization angle α. FIG. 17B illustrates a result of fitting of the luminances I(α1) to I(α4) illustrated in FIG. 17A using the expression (26). Dotted circles in FIG. 17B indicate the luminance values I(α1) to I(α4) obtained from the four captured images, and a solid line indicates a fitting curve. Thus, when there are four or more images with different polarization angles, A, φ, and Ic can be calculated using an optimization method such as the least squares method. When there are three images with different polarization angles, A, φ, and Ic can be uniquely calculated from the expression (26).

Imax and Imin represented by the expressions (16) and (17) are determined from A, Ic, and φ as described above, respectively, and the DOP ρ represented by the expression (18) can be calculated. As described above, A, Ic, φ, and ρ are calculated for each different viewpoint, φ or ρ or both are output in the area extraction step ST3, and A and φ (or the function Id(α)) and, if necessary, Ic are output in the image combining step ST4.

(3) Area Extracting Step ST3

The area extraction step ST3 acquires the polarization information for each different viewpoint calculated in the polarization analyzing step ST2 or one or both of the polarization direction φ and the DOP ρ. Arbitrary two viewpoints out of the plurality of viewpoints are paired, and one or more different pairs are created. In each pair, the difference between the viewpoints of φ or ρ is calculated between the pixels corresponding to the same position of the object, and a difference map is obtained. Then, a specific area is extracted using the sign of the difference map.

Filtering processing, such as an averaging filter, an intermediate value filter, and a Gaussian filter, may be applied to the difference map before the area extraction. The area extraction may extract the area by simply selecting the positive or negative sign in the difference map (while zero may or may not be included), or by setting an absolute value of the difference to an reliability index and by extracting a positive or negative area having an absolute value of a certain difference or higher.

Where the extracted area is binarized by setting a value of the image area to be extracted to 1 and a value of another image area to 0, filtering processing, such as the averaging filter and the Gaussian filter, may be applied to the binarized map. Then, the binarized map (having a value of 0 to 1) to which the filtering processing is applied is operated (directly produced) as a mask for the angle-dependent component in a specific direction β (before the 180° indistinguishableness is eliminated) in the image combining step ST4 described later. This processing provides the same effect as that of the area extraction.

When the area extraction uses a plurality of sets of different viewpoints, for example, a logical product of the areas extracted by each set may be calculated, or a direct product may be calculated with a mask having a value of 0 to 1. The specific area of the thus extracted object image is output to the image combining step ST4.

(4) Image Combining Step ST4

The image combining step ST4 acquires the specific area of the extracted object image in the area extracting step ST3, the angle-dependent component Id calculated in the polarization analyzing step ST2, and the angle-independent component Ic, if necessary, combines images using them, and generates an output image.

As described above, the luminance of the angle-dependent component when the object is illuminated from the specific direction θ (which is not distinguishable from (β+180°) is approximated to the angle-dependent component Id(β+90°) at the specific polarization angle (β+90°). Now assume that Id' is an approximate value of the luminance of the angle-dependent component in which the 180° indistinguishableness at β is eliminated. Then, since Id' is obtained by calculating Id(β+90°) only in the pixels included in the extracted area, it can be expressed by the following expression (41).

$$Id'(\beta) = Id(\beta + 90°) \cdot q \quad (41)$$

Id(α)=A·cos²(α−φ), q is 1 if the pixel is included in the extraction area, and 0 if not. It is 0 to 1 when the filtering processing is performed after the binarization.

Images in which the object is illuminated from the specific direction β (where the 180° indistinguishableness has been eliminated) can be combined using the approximate value I'(β) of the luminance, the angle-independent component Ic, and the following expression (42).

$$I'(\beta) = kc \cdot Ic + kd \cdot Id'(\beta) = kc \cdot Ic + kd \cdot Id(\beta + 90°) \cdot q \quad (42)$$

Here, kc and kd are arbitrary constants of 0 or more that control a ratio of the diffuse component and the specular reflection component. Id(α) and q are similar to those in expression (41).

In the above description, images illuminated from a single predetermined specific direction θ have been combined, but the present invention is not limited to this example, and images illuminated from a plurality of specific directions may be combined. In order to obtain an approximate value Id' of the luminance of the angle-dependent component in a plurality of specific directions βj (j is a subscript representing a number in a specific direction) (where the 180° indistinguishableness has been eliminated), an extraction area is prepared for each of the specific directions βj. Next, in the prepared extraction area, the angle-dependent component Id(βj+90°) or kj·Id(βj+90°) is calculated at the specific polarization angle (βj+90°) corresponding to the specific direction β*j*, where kj is an arbitrary constant of 0 or more. Finally, they may be added up. This is expressed by the following expression (43).

$$Id' = \sum_j k_j \cdot Id'_j(\beta_j) = \sum_j k_j \cdot Id(\beta_j + 90°) \cdot q_j \quad (43)$$

Id(α)=A·cos²(α−φ), $q_j$ is 1 if the extraction area for the specific direction βj includes a pixel, and 0 if not. It is 0 to 1 when the filtering processing is performed after the binarization.

When the extraction area is commonly used for a plurality of specific directions (for example, when all specific directions relate to illuminations from above the object, only the area on the upward surface may be necessary in the object image), it is unnecessary to repeat the area extracting processing for all specific directions.

By adding the angle-independent components Ic or kc·Ic over the entire area, images of an object can be combined which has been illuminated from a plurality of specific directions βj (where the 180° indistinguishableness has been eliminated). The approximate value I' of the luminance of the object surface at this time is calculated by the following expression (44).

$$I' = k_c \cdot Id_c + \sum_j k_j \cdot Id'_j(\beta_j) = k_c \cdot Id_c + \sum_j k_j \cdot Id(\beta_j + 90°) \cdot q_j \quad (44)$$

Id(α) and qj are similar to those in the expression (43).

The above description uses the angle-dependent component Id(α) represented by a trigonometric function of the expression (39) to calculate the approximate value Id' of the luminance of the angle-dependent component in a specific direction. However, this example is not limited to this implementation, and Id' may be approximated with another approximate function F(α) and the approximate value I' of the luminance of each pixel may be calculated using Id'. Id' or I' at this time can be calculated by replacing A·cos²(α−φ) in the angle-dependent component Id(α) in the expressions (41) to (44) with F(α). An arbitrary function is applicable to the approximate function F(α), but the angle that maximizes F(α) may coincide with the polarization direction φ. The term "coincide," as used herein, includes permissible errors, such as a difference of several % to some dozen %.

Figure 18A:
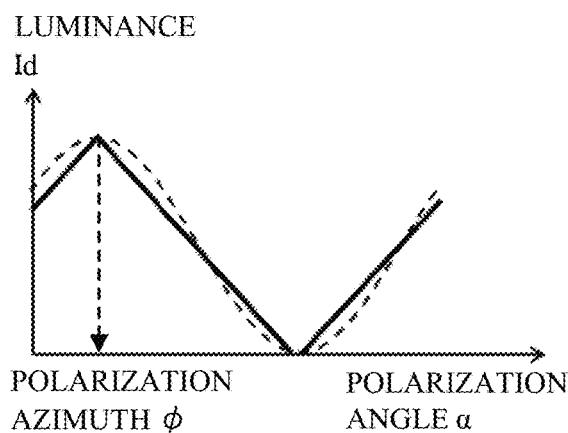
FIGS. 18A to 18C are explanatory views of an approximate function $F(\alpha)$ according to Examples 3 to 6.
Figure 18B:
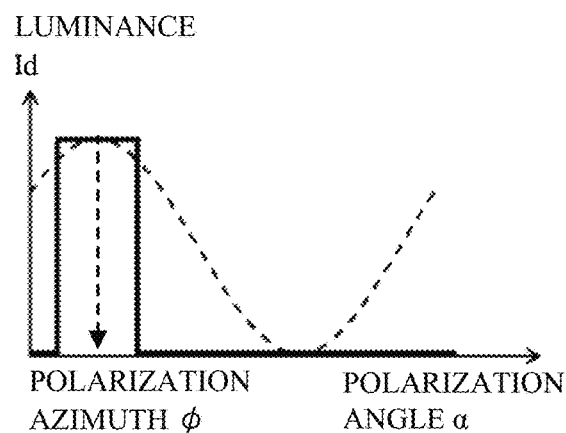
Figure 18C:
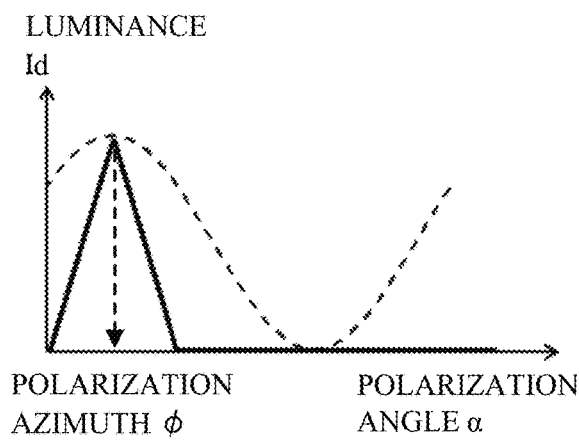

FIGS. 18A to 18C are explanatory views of the approximate function F(α). A broken curve in these figures indicates Id(α) in FIG. 17B, and a solid curve indicates F(α). As illustrated in these figures, using an arbitrary F(α) can make a change of the luminance value relative to the polarization angle α different from that of Id(α). Therefore, using F(α) for the approximate value Id' of the luminance of the angle-dependent component in a specific direction can achieve controls over the illuminated area (illumination area or illumination width) on the object surface in the generated image and the illumination luminance distribution.

The above description uses both the angle-dependent component and the angle-independent component to combine images, but may generate an image only from the angle-dependent component.

Example 3

Referring now to FIGS. 19A to 19F, a description will be given of Example 3 according to the present invention. FIG.

19A to 19F illustrate results of this example. This example generates an output image in which the 180° indistinguishableness of the illumination for an object has been eliminated, using a sign of a difference between viewpoints of the polarization directions and six input images obtained by imaging polarized light beams having polarization angles α of 0°, 45°, and 90° at each of the two different viewpoints. An object is an octahedron dice illustrated in FIG. 19A (the following binocular image at α=0°).

The two viewpoints of this embodiment are different in the horizontal direction. These two different viewpoints are obtained by dividing the pupil in the optical system into two in the horizontal direction. The pupil can be effectively divided into two by imaging using a two-dimensional image sensor 311a in which each pixel has two photodiodes arranged horizontally (often in the longitudinal direction of the two-dimensional image sensor), as in the example of FIG. 14A.

When the pupil is divided, a captured image obtained as if the object is viewed from the right side will be called a right-eye image, and a captured image obtained as if the object is viewed from the left side will be called a left-eye image. Summing or averaging the luminances of the right-eye image and the left-eye image can generate a captured image that is generally obtained when the pupil is not divided. This captured image will be referred to as a binocular image hereinafter. In principle, the right-eye image and the left-eye image asymmetrically blur due to defocus in the pupil dividing direction (which is a horizontal direction in this example). In order to obtain a more natural output image, the area extraction uses the right-eye image and the left-eye image, but the image combination that controls the illumination may use the angle-dependent component and the angle-independent component calculated from the binocular image.

Figure 19A:
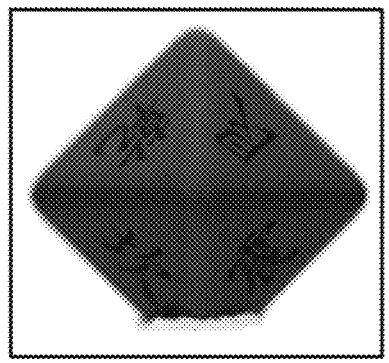
FIGS. 19A to 19F illustrate a result of Example 3.
Figure 19B:
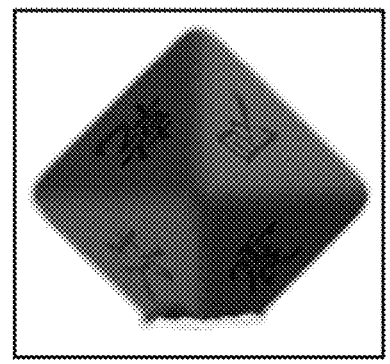

FIG. 19B shows a result of combining images obtained by calculating A, φ, and Ic in the expression (40) using the binocular images having the polarization angles α of 0°, 45°, and 90°, by setting kc to 1 and kd to 1.3 in the expression (42), and by illuminating the object from the specific direction β=45°. It can be understood that in this image due to a period of the polarization angle of 180°, the directions of 45° and 225° relative to the x-axis cannot be distinguished, and both the upper right surface and the lower left surface are illuminated.

Figure 19C:
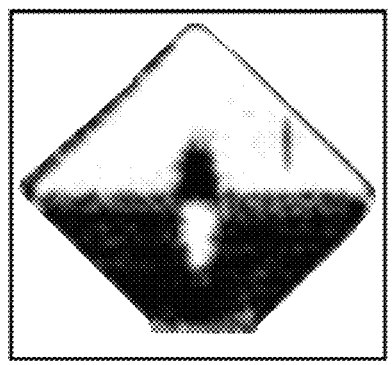
Figure 19D:
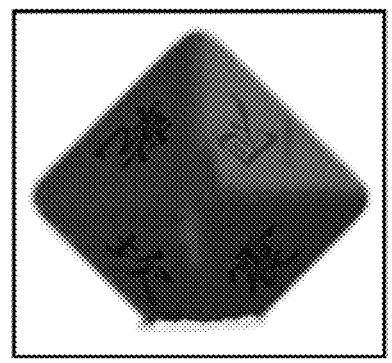
Figure 19E:
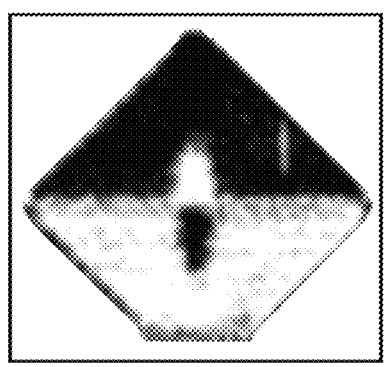

FIGS. 19C and 19E illustrates results of area extractions using the sign of the difference in polarization direction calculated for each of the left-eye image and the right-eye image. White in FIG. 19C shows an area having a negative sign of the difference, and white in FIG. 19E shows an area having a positive area of the difference. As described above, it can be seen that a portion of an upward surface can be extracted by selecting an area with a negative sign, and a portion of a downward surface can be extracted by selecting the positive area.

Figure 19F:
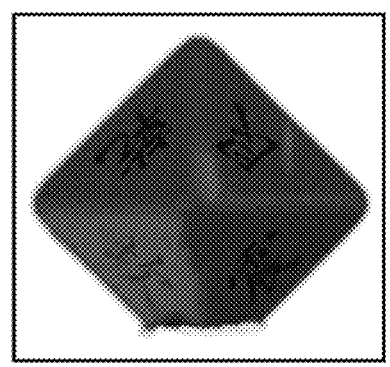

FIGS. 19D and 19F show results of calculating an approximate value of the angle-dependent component in an illumination from a specific direction of β=45° (or 225°) in each of the extracted areas and of adding it to the angle-independent component. It can be rephrased that FIGS. 19C to 19E was applied as a mask to the angle-dependent component in FIG. 19B. Thereby, it is understood that the illuminations in the directions of 45° and 225° can be distinguished according to the vertical orientation of the surface, in other words, the 180° indistinguishableness can be eliminated.

Example 4

Referring now to FIGS. 20A to 20F, a description will be given of Example 4 according to the present invention. FIG. 20A to 20F illustrate results of this example. This example acquires six input images by imaging polarized light beams having polarization angles α of 0°, 45°, and 90° at each of the two different viewpoints obtained by the same method as that in Example 3. Then, this example generates an output image in which the 180° indistinguishableness of the illumination for the object is eliminated, using the sign of the difference between the viewpoints of the DOP. The object is a kettle figure illustrated in FIG. 20A (which is a binocular image at α=0°).

Figure 20A:
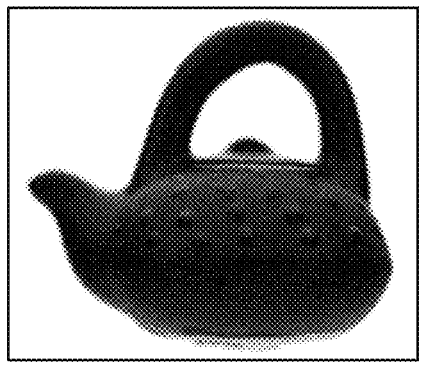
FIGS. 20A to 20F illustrate a result of Example 4.
Figure 20B:
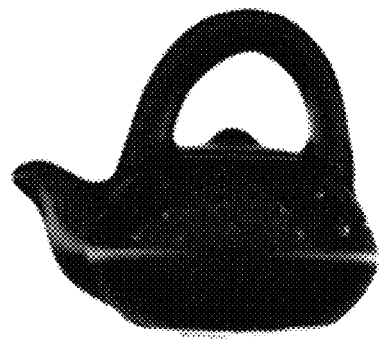

FIG. 20B shows a result of combining images in which an object is illuminated from a specific direction β=0° by setting kc to 1 and kd to 1.5 in the expression (42) after calculating A, φ, and Ic in the expression (40) using the binocular images having the polarization angles α of 0°, 45°, and 90°. Id(α) in the expression (42) is replaced with the function F(α) represented by the following expression (45).

$$F(\alpha) = \begin{cases} A \cdot \cos^2[4(\alpha - \phi)] & (\phi - 22.5° < \alpha < \phi + 22.5°) \\ 0 & (\alpha \leq \phi - 22.5°, \phi + 22.5° \leq \alpha) \end{cases} \quad (45)$$

It can be understood that in this image due to the period of 180° of polarization angle, the directions of 0° and 180° relative to the x-axis cannot be distinguished, and both the leftward surface and the rightward surface of the kettle body are narrowly illuminated.

Figure 20C:
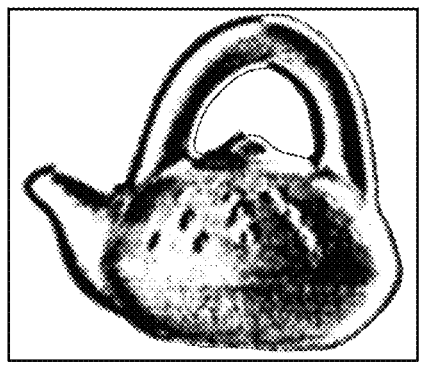
Figure 20D:
Figure 20E:
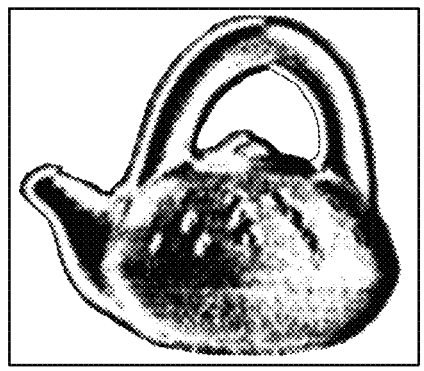

FIGS. 20C and 20E illustrate results of area extractions using the sign of the difference in the DOP calculated for each of the left-eye image and the right-eye image. White in FIG. 20C shows an area having a negative sign of the difference, and white in FIG. 20E shows an area having a positive sign of the difference. As described above, it can be seen that a portion of a leftward surface can be extracted by selecting an area with a negative sign, and a portion of a rightward surface can be extracted by selecting an area with a positive sign.

Figure 20F:

FIGS. 20D and 20F show results of calculating an approximate value of the angle-dependent component in an illumination from a specific direction of β=0° (or) 180° using the above F(α) in each of the extracted areas, and of adding it to the angle-independent component. It can be rephrased that FIGS. 20C to 20E was applied as a mask to the angle-dependent component in FIG. 20B. Thereby, it is understood that the illuminations in the directions of 0° and 180° can be distinguished according to the lateral orientation of the surface, in other words, the 180° indistinguishableness can be eliminated.

Example 5

Referring now to FIGS. 21A to 21D, a description will be given of Example 5 according to the present invention. FIGS. 21A to 21D illustrate results of this example. Examples 1 and 2 generate an output image in which the object is illuminated from a single direction, whereas this example generates an output image in which the object is illuminated from a plurality of directions. The viewpoint, the polarization angle to be imaged, and the object in the input image are the same as those in Example 2. Therefore, A, φ, and Ic in the calculated expressions (40) are the same as those in Example 2. kc, kd, and Id(α) in the expression (42)

are the same as those in the second embodiment. That is, Id(α) is replaced with the function F(α) in the expression (45).

Figure 21A:
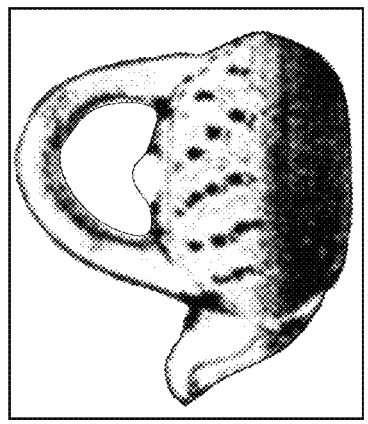
FIGS. 21A to 21D illustrate a result of Example 5.

This example sets a plurality of specific directions to β1=45° and β2=120°. This is because light is often irradiated from above onto the object in daily life. Therefore, a portion of an upward object surface is extracted. Considering that the parallax in this embodiment is in the horizontal direction, the sign of the difference between the left-eye image and the right-eye image in the polarization direction is used. FIG. 21A shows a result of an area extraction, and it is understood that the area whose surface faces upward is extracted.

Figure 21D:
Figure 21C:
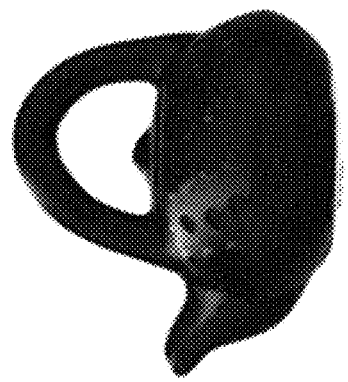
Figure 21B:

FIGS. 21B and 21C show results of calculating an approximate value Id' of angle-dependent component in each of specific directions β1 and β2 in the extraction area (using F(α) in the expression (45)) and of adding it to the angle-independent component. Thereby, it can be seen that the illumination can be correctly made from the directions of 45° or 120° without causing the 180° indistinguishableness.

Finally, FIG. 21D shows a result of calculating a sum of approximate values Id'(45°) and Id'(120°) of the angle-dependent components in the two specific directions of 45° and 120° and of adding the result to the angle-independent component. An illumination state can be naturally expressed in which spotlights are applied from two directions to an upward surface.

Example 6

Figure 22:
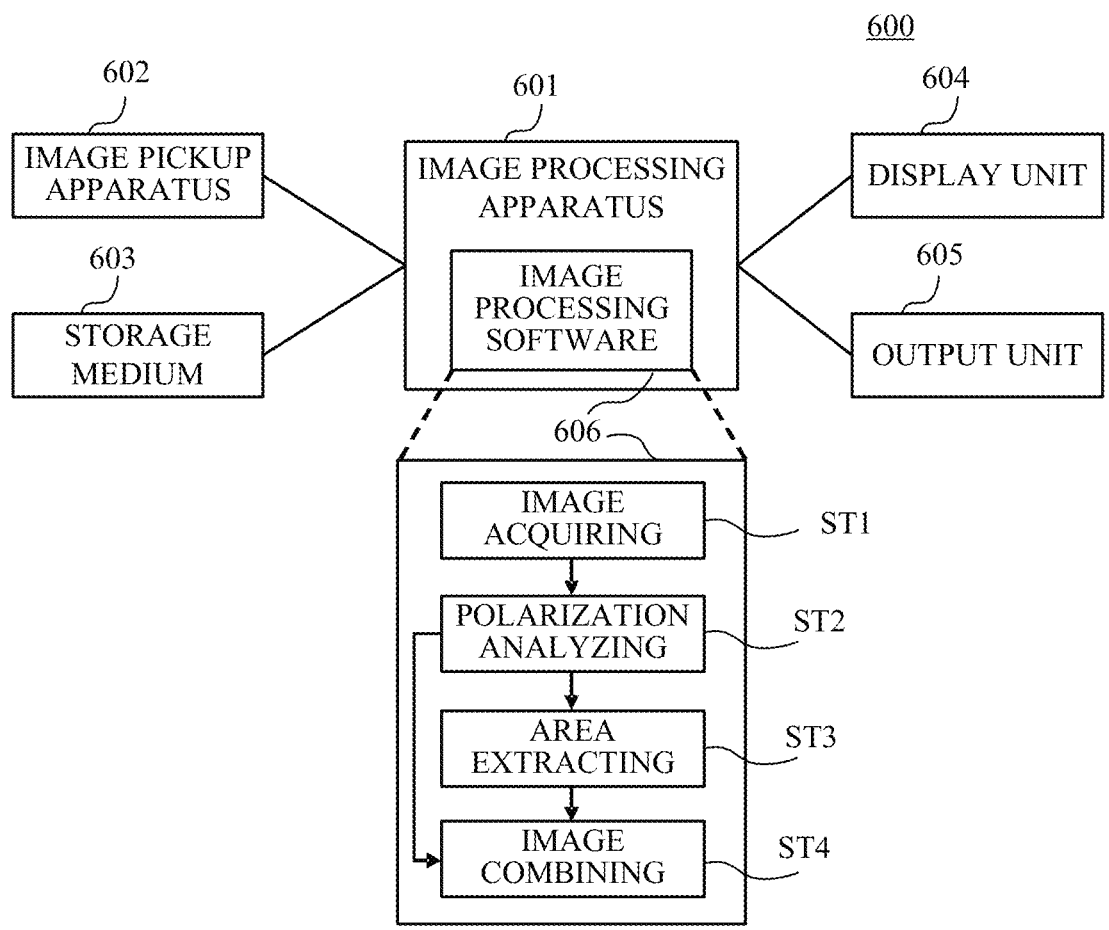
FIG. 22 is a block diagram of an image processing system according to Example 6.

Referring now to FIG. 22, a description will be given of Example 6 according to the present invention. FIG. 22 is a block diagram of an image processing system 600 according to this example. The image processing system 600 includes an image processing apparatus 601, an image pickup apparatus 602, a storage medium 603, a display unit 604, and an output unit 605.

The image processing apparatus 601 installs image processing software (image processing program as a computer program) 606. The image processing apparatus 601 executes a polarization analysis, an area extraction, and an image combination by executing the image processing of the steps ST1 to ST4 described above according to the image processing software 606.

The image pickup apparatus 602 is an apparatus, such as a camera, a telescope, or an endoscope, that acquires an image through image pickup. Examples of the camera include a lens interchangeable type digital camera, which includes an interchangeable lens, an adapter, a CMOS image sensor, and the like. The storage medium 603, such as a semiconductor memory, a hard disk drive, or a server on a network, stores an image acquired through imaging.

The image processing apparatus 601 acquires an input image from the image pickup apparatus 602 or the storage medium 603 by wired or wireless communications with them or through an attachment and reading. Then, an output image is generated by the image processing described above, and is output to at least one of the output unit 605, the image pickup apparatus 602, and the storage medium 603. The output image can be stored in a storage unit (internal memory) built in the image processing apparatus 601. The output unit 605 is, for example, a printer.

The display unit 604 is connected to the image processing apparatus 601. Therefore, the user can perform the image processing work and evaluate the generated output image via the display unit 604. In addition to the above image processing, the image processing apparatus 601 may perform development processing, image recovery processing, and the like, if necessary.

As described above, in Examples 3 to 6, the image processing apparatus 601 can execute the first processing, the second processing, and the third processing. The first processing acquires captured images captured with different polarization angles at each of a plurality of different viewpoints (a plurality of captured images obtained by capturing the object while changing the polarization angle of the light from the object). The second processing acquires polarization information of the object. The third processing generates a generated image in which an illumination state of the object is different from that of the captured image. The second processing acquires light intensity information that changes according to the polarization angle using the captured images. The third processing extracts a partial area in an image area of the captured images or the generated image using a sign of a difference of the polarization information on a plurality of different viewpoints, and generates the generated image using an extracted partial area and the light intensity information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each example can provide an image processing apparatus, an image pickup apparatus, an image processing method, and a storage medium, each of which can combine images illuminated from arbitrary directions using polarization information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-199697, filed on Dec. 1, 2020, which is hereby incorporated by reference herein in its entirety.

What is claimed is:

1. An image processing apparatus comprising:
at least one processor or circuit configured to execute a plurality of tasks including:
a first processing task configured to acquire surface normal information of an object;
a second processing task configured to acquire a plurality of first images acquired by capturing the object while changing a polarization angle of light from the object in a first illumination state;
a third processing task configured to acquire polarization information of the object; and
a fourth processing task configured to generate a second image of the object corresponding to in a second illumination state different from the first illumination state,
wherein the third processing task acquires light intensity information that changes according to the polarization angle using the plurality of first images,
wherein the fourth processing task:
extracts a partial area of the plurality of first images using the surface normal information; and
generates the second image by changing a luminance value in the partial area based on information on the second illumination state and the light intensity information, and
wherein the following conditional expression is satisfied:

$$\alpha 0 - 90° \le \varphi 1 < \alpha 0 + 90°,$$

where $\varphi 1$ is an azimuth angle of a surface normal of the object in the partial area, and $\alpha 0$ is an angle of an illumination direction in the second illumination state.

2. The image processing apparatus according to claim 1, wherein the surface normal information includes information on a position of a projection of a surface normal of the object onto a plane.

3. The image processing apparatus according to claim 1, wherein the first processing task acquires the surface normal information based on areas having different luminances in a plurality of images obtained by capturing the object while sequentially irradiating light from a plurality of light sources located at different positions.

4. The image processing apparatus according to claim 1, wherein the first processing task acquires the surface normal information based on a plurality of images obtained by capturing the object while sequentially irradiating light from three or more light sources located at different positions.

5. The image processing apparatus according to claim 1, wherein the first processing task acquires the surface normal information using distance information to the object.

6. An image pickup apparatus comprising:
the image processing apparatus according to claim 1; and
an image sensor configured to capture the object.

7. An image processing method comprising:
acquiring surface normal information of an object;
acquiring a plurality of first images acquired by capturing the object while changing a polarization angle of light from the object in a first illumination state;
acquiring polarization information of the object; and
generating a second image of the object corresponding to a second illumination state different from the first illumination state,
wherein the light intensity information changes according to the polarization angle, using the plurality of first images,
wherein the generating of the second image:
extracts a partial area of the plurality of first images using the surface normal information; and
generates the second image by changing a luminance value in the partial area based on information on the second illumination state and the light intensity information, and
wherein the following conditional expression is satisfied:

$$\alpha 0 - 90° \le \varphi 1 < \alpha 0 + 90°,$$

where $\varphi 1$ is an azimuth angle of a surface normal of the object in the partial area, and $\alpha 0$ is an angle of an illumination direction in the second illumination state.

8. A non-transitory storage medium storing a program executable by a computer to execute the image processing method according to claim 7.

9. An image processing apparatus comprising:
at least one processor or circuit configured to execute a plurality of tasks including:
a first processing task configured to acquire a plurality of first images obtained by capturing an object at first and second viewpoints while changing a polarization angle of light from the object in a first illumination state;
a second processing task configured to acquire:
light intensity information that changes according to the polarization angle using the plurality of first images; and
polarization information of the object based on the acquired light intensity information; and
a third processing task configured to generate a second image of the object that corresponds to a second illumination state different from the first illumination state,
wherein the third processing task:
extracts a partial area of the first images using a sign of a difference of the polarization information at the first viewpoint and the polarization information at the second viewpoint; and
generates the second image by changing a luminance value in the partial area based on information on the second illumination state and the light intensity information.

10. The image processing apparatus according to claim 9, wherein the polarization information is information on a polarization direction or a degree of polarization.

11. The image processing apparatus according to claim 10, wherein the sign of the difference in the polarization information is a sign of a difference in the polarization direction.

12. The image processing apparatus according to claim 10, wherein the sign of the difference in the polarization information is a sign of a difference in the degree of polarization.

13. The image processing apparatus according to claim 9, wherein the plurality of different viewpoints are acquired through imaging at a plurality of different points.

14. The image processing apparatus according to claim 9, wherein the plurality of different viewpoints are acquired by dividing a pupil in an optical system at a single location and by imaging.

15. The image processing apparatus according to claim 14, wherein the plurality of different viewpoints are different in a longitudinal direction of an image sensor.

16. An image pickup apparatus comprising:
the image processing apparatus according to claim 9; and
an image sensor configured to capture an object.

* * * * *